US007800839B2

(12) United States Patent
Togino

(10) Patent No.: US 7,800,839 B2
(45) Date of Patent: Sep. 21, 2010

(54) OPTICAL SYSTEM

(75) Inventor: Takayoshi Togino, Shibuya-ku (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/448,451

(22) PCT Filed: Nov. 15, 2007

(86) PCT No.: PCT/JP2007/072598

§ 371 (c)(1),
(2), (4) Date: Jun. 17, 2009

(87) PCT Pub. No.: WO2008/075529

PCT Pub. Date: Jun. 26, 2008

(65) Prior Publication Data

US 2010/0007969 A1    Jan. 14, 2010

(30) Foreign Application Priority Data

Dec. 19, 2006   (JP)   .............................. 2006-340788

(51) Int. Cl.
*G02B 13/06*   (2006.01)
(52) U.S. Cl. .......................... 359/725; 359/648; 359/649
(58) Field of Classification Search .................. 359/648, 359/649, 725
See application file for complete search history.

(56) References Cited

U.S. PATENT DOCUMENTS 4,566,763 A    1/1986   Greguss
5,473,474 A    12/1995  Powell
6,597,520 B2 * 7/2003   Wallerstein et al. .......... 359/725
6,611,282 B1   8/2003   Trubko et al.
2006/0238879 A1 * 10/2006  Togino ........................ 359/637
2008/0151380 A1 * 6/2008   Togino ........................ 359/649

FOREIGN PATENT DOCUMENTS

JP    2006-243689    9/2006
JP    2006-292814    10/2006

* cited by examiner

*Primary Examiner*—Evelyn A. Lester
(74) *Attorney, Agent, or Firm*—Kenyon & Kenyon LLP

(57) ABSTRACT

The invention relates to an optical system which is adapted to form an image having a full 360° (panoramic)-direction angle of view on an image plane or project an image located on an image plane in a full 360° (panoramic)-direction angle of view, and which is of small-format size and high resolving power yet without being affected by flare light. The optical system comprises a front unit (10) having two reflecting surfaces and two transmitting surfaces, each rotationally symmetric about a center axis (1), a rear unit (20) that is rotationally symmetric about the center axis and has positive power, and an aperture (5) located coaxially with the center axis. A light beam incident onto the front unit passes through the first transmitting surface (11), and is reflected at the first reflecting surface (12) located in opposition to the first transmitting surface with the center axis between them in a direction away from the image plane and then is reflected at the second reflecting surface (13) located on the same side as the first transmitting surface in a direction toward the image plane, leaving the transparent medium via the second transmitting surface (14). The outgoing light is imaged on the image plane (30) by way of the rear unit (20) such the entrance pupil (6Y) in the section including the center axis (1) is positioned near the second reflecting surface (13).

23 Claims, 21 Drawing Sheets

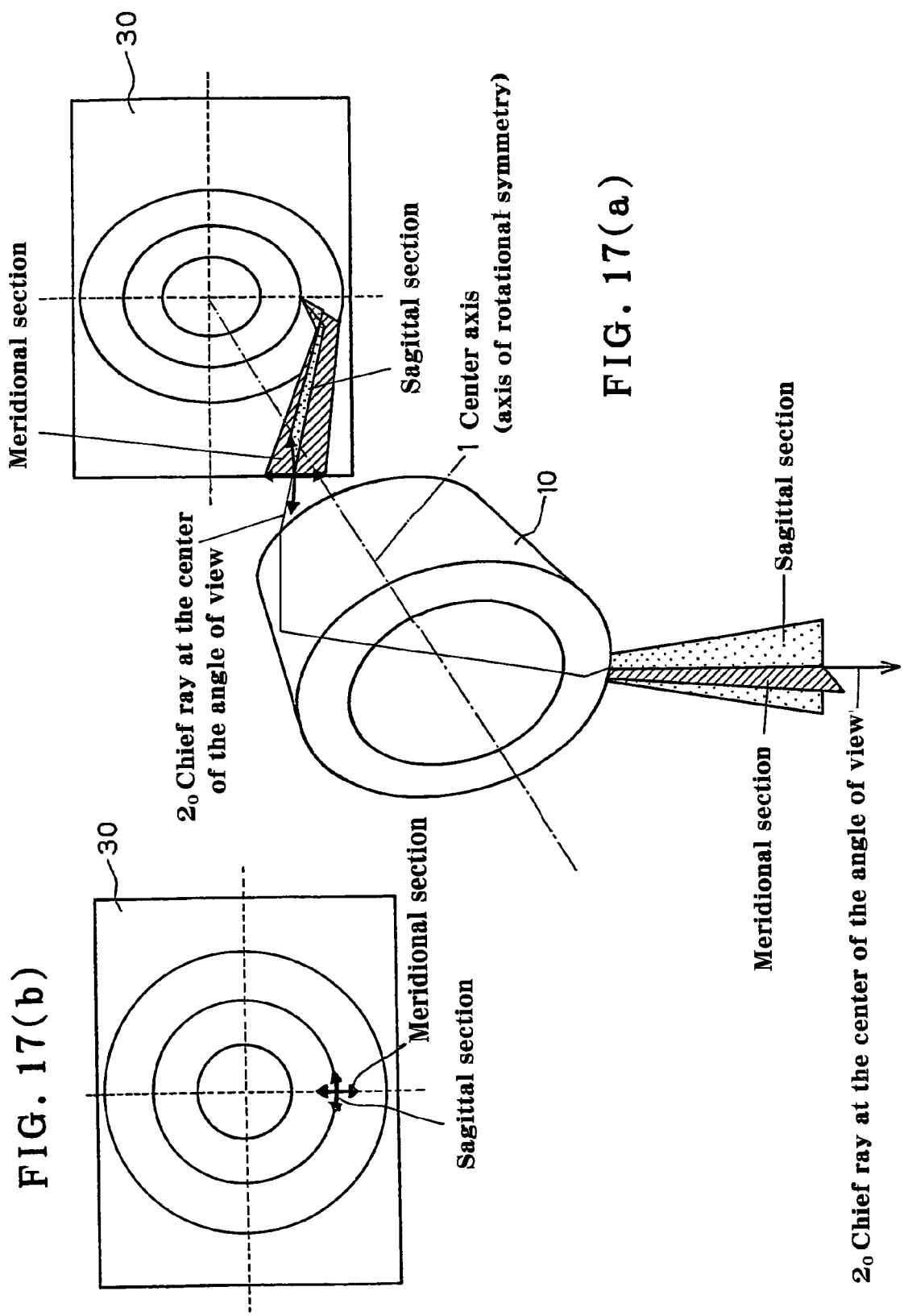

OPTICAL SYSTEM

ART FIELD

The present invention relates generally to an optical system, and more specifically to an optical system that is of small-format size and high resolving power, and that is well suited for use on all sky cameras, all sky projectors, etc., designed to form on an image plane an image having a full 360°-direction angle of view or project an image located on an image plane at a full 360°-direction angle of view.

CROSS-REFERENCE TO RELATED APPLICATION

The present application is based upon and claims the benefit of priority from the prior Japanese Patent Application No. 2006-340788 filed on Dec. 19, 2006, the entire contents of which are incorporated herein by reference.

BACKGROUND OF THE INVENTION

Among prior small-sized optical systems using a catadioptric optical system to obtain full 360°-direction (full-panoramic) images, there is one made up of a front unit comprising a transparent medium that is rotationally symmetric about a center axis and includes two internal reflecting surfaces and two transmitting surfaces (an entrance and an exit surface) and a rear unit that is rotationally symmetric about the center axis and has positive power, as set forth in patent publications 1 and 2.

Patent Publication 1
U.S. Pat. No. 4,566,763
Patent Publication 2
U.S. Pat. No. 5,473,474

A problem with either of patent publications 1 and 2 is, however, that images go worse because an entrance pupil is not positioned near the entrance surface and the effective diameter of the entrance surface grows large, so that there is much harmful flare light coming from the zenithal direction or the ground. Another problem is that aberrations are not always well corrected, nor is resolving power high.

Such being the case, a main object of the invention is to provide an optical system that is adapted to obtain an image having a full 360°-direction angle of view or project an image at a full 360°-direction (full-panoramic) angle of view, and is of small-format size and well corrected for aberrations without being affected by flare light yet with high resolving power.

DISCLOSURE OF THE INVENTION

According to the invention, the above object is achieved by the provision of an optical system, which is adapted to form an image having a full 360°-direction (full-panoramic) angle of view on an image plane or project an image located on an image plane at a full 360°-direction angle of view, characterized by comprising: a front unit having two reflecting surfaces, each rotationally symmetric about a center axis, a rear unit that is rotationally symmetric about the center axis and has positive power, and an aperture located coaxially with the center axis, wherein:

said front unit comprises a transparent medium that is rotationally symmetric about the center axis and comprises a first transmitting surface, a first reflecting surface, a second reflecting surface and a second transmitting surface;

said first reflecting surface is located on an image plane side with respect to said first transmitting surface, said second reflecting surface is located in opposition to an image plane with respect to said first reflecting surface, and said second transmitting surface is located more on the image plane side than said first transmitting surface; and in order of travel of light rays in the case of an imaging system or in reverse order of travel of light rays in the case of a projection system, a light beam incident onto said front unit enters the transparent medium via said first transmitting surface, is reflected at said first reflecting surface located in opposition to said first transmitting surface with the center axis between them in a direction away from the image plane and then reflected at said second reflecting surface located on the same side with respect to the center axis in a direction toward the image plane side, and leaves said transparent medium via said second transmitting surface, forming an image at a position of the image plane off the center axis by way of said rear unit, wherein in a section including the center axis and in a section orthogonal to said section and including a center ray of said light beam, a position of an entrance pupil differs such that said entrance pupil in the section including said center axis is positioned near said second reflecting surface.

It is then preferable to satisfy the following condition (1):

$$1° < \eta < 10° \tag{1}$$

where $\eta$ is an angle of a center chief ray with a normal to said first reflecting surface upon reflection at said first reflecting surface, provided that said center chief ray is defined by a light ray passing through a center of said aperture at a center of an angle of view in a meridional section.

It is also preferable to satisfy the following conditions (2) and (3):

$$0.7 < |C1x/C2x| < 5.0 \tag{2}$$

$$0.35 < |C1x/C3x| < 2.0 \tag{3}$$

where $C1y$, $C2y$ and $C3y$ are curvatures of a meridional section at positions of a center chief ray incident onto said first transmitting surface, said first reflecting surface and said second reflecting surface, respectively, and $C1x$, $C2x$ and $C3x$ are curvatures of a section orthogonal to the center axis, provided that said center chief ray is defined by a light ray passing through a center of said aperture at a center of an angle of view in the meridional section.

Preferably, the entrance pupil in the section including the center axis is positioned near said first transmitting surface, and the entrance pupil in the section orthogonal to the section including the center axis is positioned near the center axis.

Preferably, the number of formation of a stop image obtained by projection of said aperture in a direction opposite to the direction of incidence of said light beam, is the same in the section including the center axis and in the section orthogonal to said section and including the center ray of said light beam.

Preferably, at least one reflecting surface has a rotationally symmetric shape formed by rotation about the center axis of a line segment of any arbitrary shape having no plane of symmetry.

Preferably, at least one reflecting surface has a rotationally symmetric shape formed by rotation about the center axis of a line segment of any arbitrary shape including an odd-numbered order term.

Preferably, a flare stop for limiting the aperture only in the section including the center axis is located near the entrance pupil conjugate with a stop formed by said front unit on an object side in the section including the center axis.

Preferably, said rear unit comprises a rotationally symmetric, coaxial dioptric optical system.

Preferably, instead of or in addition to said aperture, a zonal slit aperture rotationally symmetric about the center axis is located near said first transmitting surface of the front unit.

At least said reflecting surfaces may be cut in the section including the center axis such that the angle of view about the center axis is narrower than 360°.

BRIEF DESCRIPTION OF THE DRAWINGS

FIG. 17 is illustrative of the definition of the meridional section, and the sagittal section.

BEST MODE FOR CARRYING OUT THE INVENTION

The optical system of the invention is now explained with reference to some specific examples.

Figure 1:
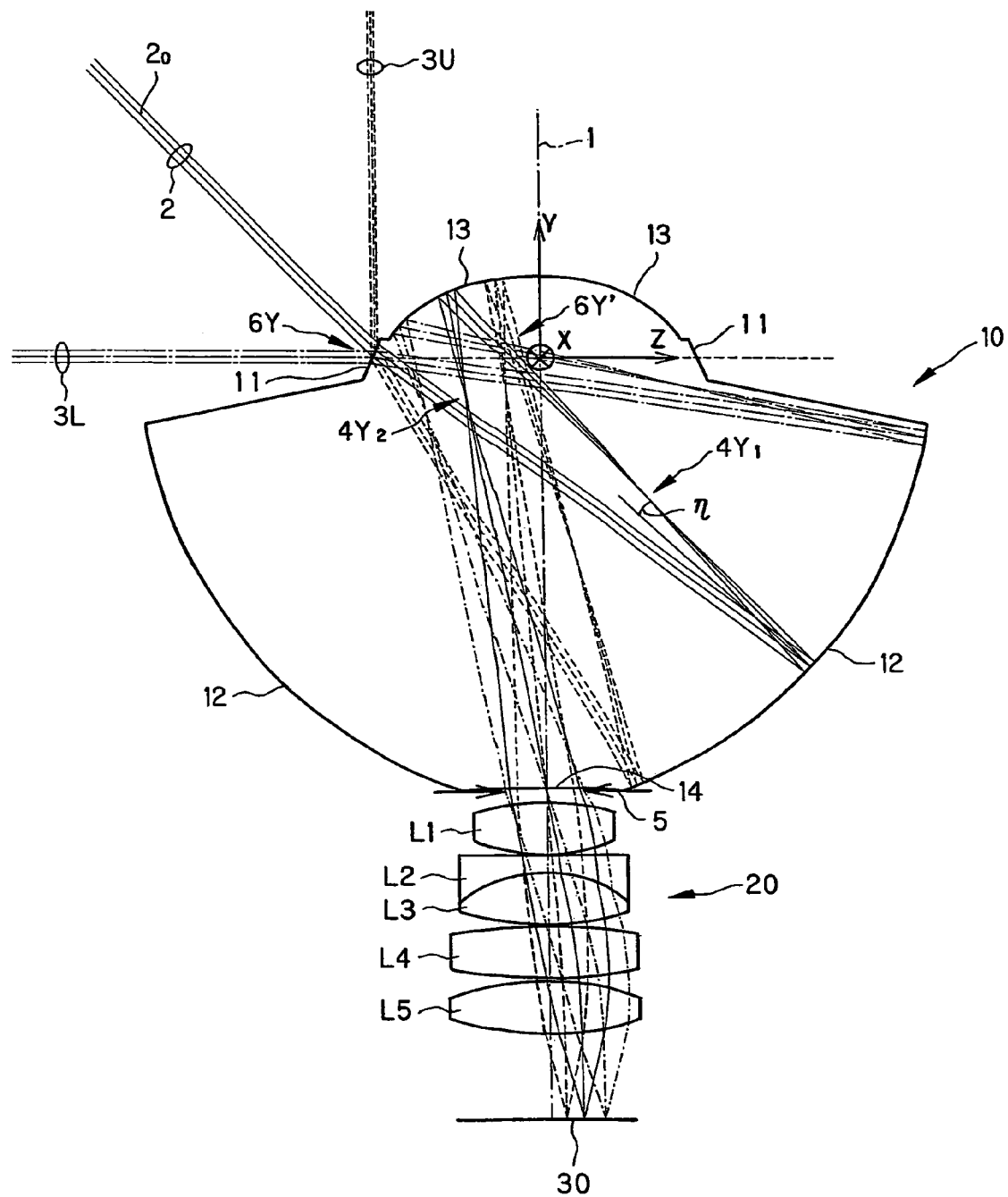
FIG. 1 is a sectional view of the optical system according to Example 1 of the invention, as taken along the center axis.
Figure 2:
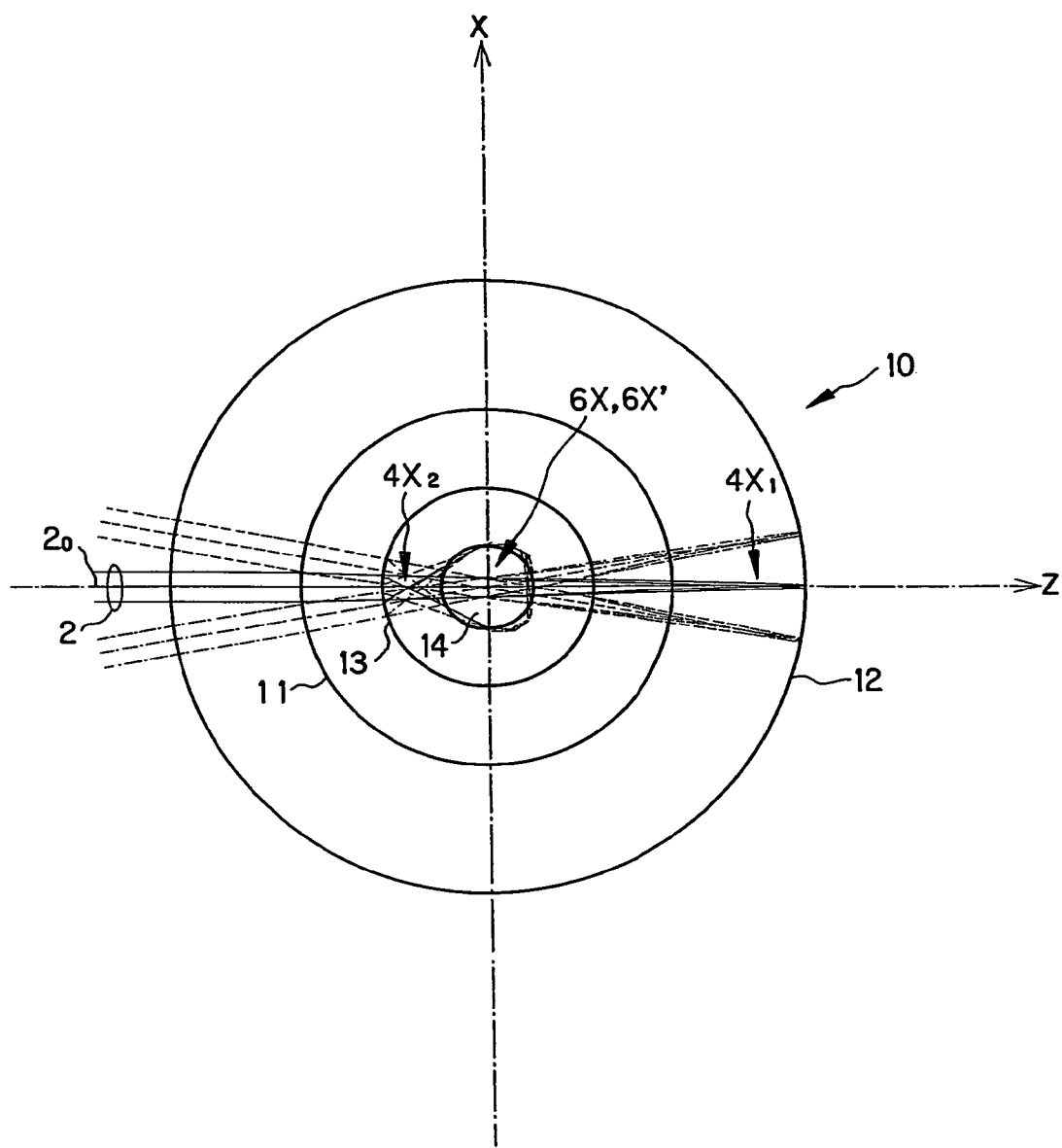
FIG. 2 is a plan view of an optical path through the optical system according to Example 1 of the invention.

FIG. 1 is a sectional view of the optical system according to Example 1, described later, as taken along the center axis (the axis of rotational symmetry) 1, and FIG. 2 is a plan view of an optical path taken through the optical system. The optical system of the invention is now explained more specifically with reference to FIGS. 1 and 2. Note here that while the optical system will be explained in the form of an imaging optical system, it may just as well be used in the form of a projection optical system by reversing the optical path, which is to project an image in a full-360° (full-panoramic) direction. In FIG. 2, note also that in addition to an optical path taken by light coming from the azimuth direction of 0°, there are optical paths taken by light coming from directions of ±10°.

The optical system of the invention is built up of a front unit 10 rotationally symmetric about a center axis 1 and a rear unit 20 rotationally symmetric about the center axis 1, and a light beam 2 incident from a far away object is imaged at a position of an image plane 30 vertical to and off the center axis 1 after passing through the front unit 10 and the rear unit 20 in order.

The front unit 10 is formed of a transparent medium such as resin that is rotationally symmetric about the center axis 1 and has a refractive index of 1 or greater, and has two internal reflecting surfaces 12 and 13 and two transmitting surfaces (entrance and exit surfaces) 11 and 14. The internal reflecting surfaces 12 and 13 as well as the transmitting surfaces 11 and 14, too, are configured in such a way as to be rotationally symmetric about the center axis 1. The rear unit 20 is built up of a coaxial dioptric optical system comprising a lens system or the like that is rotationally symmetric about the center axis 1 and has positive power.

And the transparent medium of the front unit 10 is built up of the first transmitting surface 11, the first reflecting surface 12, the second reflecting surface 13 and the second transmitting surface 14. More specifically, the first transmitting surface 11 is located on an object side with respect to the center axis 1; the first reflecting surface 12 is opposite to the first transmitting surface 11 with the center axis 1 between them, and located more on an image plane 30 side than the first transmitting surface 11; the second reflecting surface 13 is located on the same side with respect to the center axis 1 as the first transmitting surface 11 and on the opposite side to the image plane 30 with respect to the first transmitting surface 11; and the second transmitting surface 14 is located more on the image plane 30 side than the first transmitting surface 11.

And, a light beam 2 incident from afar enters the transparent medium through the first transmitting surface 11, and is reflected at the first reflecting surface 12 located opposite to the first transmitting surface 11 with the center axis 1 between them in a direction away from the image plane 30. The reflected light is then reflected at the second reflecting surface 13 located on the same side with respect to the center axis 1 as the first transmitting surface 11 in a direction toward the image plane 30 side, leaving the transparent medium through the second transmitting surface 14. The outgoing light is then imaged at a radially given position of the image plane 30 off the center axis 1 through a round aperture 5 that is located coaxially with the center axis 1 between the front unit 10 and the rear unit 20 to form a stop as well as the rear unit 20 of positive power.

Thus, the front unit 10 serves to receive a light beam coming from a full-panoramic image toward the rotationally symmetric axis (center axis) 1 to transform it into an annular aerial image at any arbitrary position, and the rear unit serves to project that annular aerial image onto a plane of an imaging device positioned on the image plane 30. Field curvature and astigmatism that remain under-corrected at the front unit 10 may be corrected such that they are made up for at the rear unit 20.

Then, the stop-forming round aperture 5 interposed coaxially with the center axis 1 between the front unit 10 and the rear unit 20 is back projected by the front unit 10 thereby forming an entrance pupil. The invention here is characterized in that in the meridional section, that entrance pupil is located in the form of a meridional direction entrance pupil 6Y near the first transmitting surface (entrance surface) 11 and near the second reflecting surface 13, whereas, in the sagittal section, it is projected in the form of a sagittal direction entrance pupil 6X onto the center axis (rotationally symmetric axis) 1. With the prior art (Patent Publication 1), the flare stop for cutting off harmful light could not effectively be located because both the entrance pupil in the meridional section and the entrance pupil in the sagittal section are located on the center axis.

It should here be noted that the meridional section, and the sagittal section is defined as shown in FIG. 17. FIG. 17(a) is illustrative in perspective and schematic of the optical path taken through the inventive optical system, and FIG. 17(b) is illustrative of a section at the center position of the angle of view on the image plane 30. That is, it is the meridional section that includes the center axis (the axis of rotational symmetry) 1 of the optical system and the center ray (center chief ray) $2_0$ of a center light beam arriving at the center of the angle of view, and it is the sagittal section that is orthogonal to that meridional section and includes the center ray (chief ray) $2_0$.

In the optical system of the invention, the curvature of a line segment of any arbitrary shape that is rotated about the center axis 1 to determine the shape of the reflecting surface 12, 13, and the refracting surface 11, 14, and the then curvature of rotation with respect to the center axis 1, i.e., the curvature of the sagittal section are independently given. This enables the aperture 5 to be once back projected to form an image 6Y which is again back projected to form the entrance pupil 6Y in the meridional section near the first transmitting surface 11 and near the second reflecting surface 13 in the front unit 10, so that much of inessential light entering the front unit 10 can be cut off to reduce flares.

Further in the invention, it is possible to make the angle of view in the meridional section wide. For the arrangement here wherein the reflecting surfaces 12, 13 and the transmitting surface 11 are located with the center axis (the axis of rotational symmetry) 1 between them, it is important how interferences of the surfaces are avoided. For this reason, the first transmitting surface 11 should be located near the center axis 1. As the first transmitting surface 11 is located near the center axis 1, it allows light rays in the meridional section to arrive at the first reflecting surface 12 longer before they spread out extensively than otherwise. It is thus possible to make sure the wide angle of view in the meridional section even with a reduced effective diameter of the first reflecting surface 12.

The second reflection surface 13, too, should desirously be located near the center axis 1. This is the condition for enabling the angle of view of an image formed by the front unit 10 to be kept small with respect to the optical system of the rear unit 20. The second reflecting surface 13 is the final surface at which a light beam is reflected toward the rear unit 20: as that surface is located near the center axis 1, it enables a light beam having a small angle of view to go from the front unit 10 toward the rear unit 20. This in turn enables burdens on the rear unit 20 to be lifted off, setting up a fast optical system having a reduced part count.

Here let a light ray passing through the center of the aperture 5 at the center of the angle of view in the meridional section be defined as the center chief ray $2_0$, and an angle of the center chief ray $2_0$ with the first reflecting surface 12 upon reflection at that surface be indicated by η. It is then preferable to satisfy the following condition (1):

$$1°<\eta<10° \tag{1}$$

As the lower limit of 1° is not reached, it gives rise to interferences of the effective diameters of the first transmitting surface 11 and second reflecting surface 13, rendering it impossible to gain the angle of view. As the upper limit of 10° is exceeded, it causes more decentration aberrations to occur at the first reflecting surface 12, rendering it to correct them at other surfaces. Moreover, it causes the first transmitting surface 11 to be located far away from the axis 1 of rotational symmetry: this time the effective diameter of the first reflecting surface 12 grows large, rendering it impossible to gain a wide viewing angle.

More preferably, $$2°<\eta<8° \tag{1-1}$$

In the sagittal section orthogonal to the center axis 1, on the other hand, there is a rotationally symmetric system provided; the light beam, too, will pass through it rotationally symmetrically, and so the light beam having the same image height on the annular image will constantly pass twice on the center axis 1 that is the center of rotation (see FIG. 2). In the sagittal section, accordingly, the light arriving at the image plane 30 on the circumference will arrive at the image plane 30 after passing twice on the center axis 1, and so the entrance pupil 6X in the sagittal section that is the image of the aperture or stop 5 back projected in the sagittal section will lie on the center axis 1 (the image 6X is the first-formed image of the aperture 5).

Such being the arrangement, it is of importance for the front unit 10 to comprise a surface of rotationally symmetric shape that is defined by the rotation about the center axis 1 of a line segment of any arbitrary shape whose curvature can freely be controlled in both the meridional and the sagittal section. Further in the front unit 10, light is reflected at or transmitted through the decentrated surfaces 11 to 14 having power, giving rise to some large decentration aberrations. To correct them, it is of importance to use for the reflecting surfaces 12 and 13 in particular a surface obtained by the rotation of a line segment for which an odd-number order term or the like is used and which is free of any plane of symmetry.

Here, let the center axis 1 be defined as the Y-axis, and a section including the center axis 1 (FIG. 1) be defined as the Y-Z plane. If, as described above, the entrance pupil 6Y in the meridional section is located near the first transmitting surface 11 and near the second reflecting surface 13 in the first unit 10, it is then possible to locate near that entrance pupil 6Y a flare stop in a slit form in the Y-direction, thereby cutting off inessential light with that flare stop.

Such a mechanical slit-form stop may be used as the flare stop. Alternatively, a casing for the purpose of protecting the optical system or a transparent pipe having a non-transmittable portion painted in black and coaxial with the center axis 1 may be used as the flare stop. Yet alternatively, a reflection coating portion of the reflecting surface 13 may be used, or an optically inaccessible, sand polished or black painted portion of the front unit 10 may be used.

In the inventive optical system of FIG. 1, it is preferable that the number of back projection relays of the stop 5 in the sagittal section sets the same with the number of back projection relays of the stop 5 in the meridional section. In Example 1 given later, the first transmitting surface 11 and the first reflecting surface 12 are located with the center axis 1 between them. Further, the second reflecting surface 13 is located in opposition to the first reflecting surface 12 with the center axis 1 between them, and on the same side as and adjacent to the first transmitting surface 11. For this reason, as shown in FIG. 2, a light beam having an angle of view in the sagittal section will be incident onto the stop 5 after passing twice on the center axis 1. This means that the back projected stop image is once formed as the image 6X on the center axis 1 between the first reflecting surface 12 and the second reflecting surface 13, and formed as the image 6X on the center axis 1 even between the first transmitting surface 11 and the first reflecting surface 12. It follows that in Example 1, there is a single relay arrangement provided where, in the sagittal section, the once formed stop image is once more formed. This means that for correction of aberrations, it is preferable that the sagittal and meridional sections of the surfaces 11 to 14 in general and the reflecting surfaces 12 and 13 in particular have relatively the same power: it is preferable that there is also a single relay arrangement involved even in the meridional section.

However, as the back projection position of the stop 5 in the meridional section, too, lies on the center axis, it causes an increase in the effective diameter of the entrance surface, giving rise to more flares going against the purport of the invention. Further, as the effective diameters of the surfaces grow large, it triggers off interferences of them, rendering it impossible to gain a wide angle of view in the vertical direction (along the center axis 1). In the invention, therefore, 6Y of the stop images back projected in the meridional section and nearest to the object side is located near the first transmitting surface 11 and near the second reflecting surface 13.

Next in the inventive optical system, the first transmitting surface 11 is substantially in opposition to the first reflecting surface 12 with the center axis 1 between them. However, this means that the first reflecting surface 12, onto which a light beam is incident from an 180° opposite side, is going to be located adjacent to the first transmitting surface 11 in the center axis 1 direction. To enable such arrangement, interferences of the first transmitting surface 11 and the first reflecting surface 12 are avoided by titling the first transmitting surface 11 with respect to the center axis 1 to refract a light beam through the first transmitting surface 11. However, the refraction of the light beam through the first transmitting surface 11 gives rise to chromatic aberrations due to chromatic dispersion. Of course, they may be corrected at the second transmitting surface 14, but there are preferably no or little chromatic aberrations. To this end, it is preferable that the angle of refraction of light by the first transmitting surface 11 is kept small, and the first transmitting surface 11 is located adjacent to the first reflecting surface 12.

As the angle of view is set such that an upward direction is chiefly viewed with the perpendicular of the image plane lying at the zenith, the light beam after transmitting through the first transmitting surface 11 travels downward even when the angle of refraction of light by the first transmitting surface 11 is small. For this reason, even when the angle of refraction of the first transmitting surface 11 is small, the first reflecting surface 12 can be located below the first transmitting surface 11.

Reference is now made to the condition about the power of the first transmitting surface 11, the first reflecting surface 12, and the second reflecting surface 13 in the inventive optical system.

Here let a light ray passing through the center of the aperture 5 at the center of the angle of view in the meridional section be defined as the center chief ray $2_0$, the curvatures of the meridional section at positions of the first transmitting surface 11, the first reflecting surface 12 and the second reflecting surface 13 onto which the center chief ray $2_0$ is incident be indicated by C1y, C2y and C3Y, respectively, and the curvatures of a section orthogonal to the center axis be indicated by C1x, C2x and C3x, respectively. It is then preferable to satisfy the following condition (2):

$$0.7 < |C1x/C2x| < 5.0 \qquad (2)$$

Condition (2) defines the ratio of the curvatures of the sections of the first transmitting surface 11 and the first reflecting surface 12 orthogonal to the center axis (the axis of rotational symmetry) 1 at their positions where the center chief ray strikes them: it is equivalent to the ratio of reciprocals of distances from the axis 1 of rotational symmetry to the sections orthogonal to that axis. As the lower limit of 0.7 is not reached, it causes the first transmitting surface 11 to be too away from the axis 1 of rotational symmetry, resulting in the need of increasing the effective diameter of the first reflecting surface 12 or rendering it impossible to gain a wide angle of view in the meridional direction.

As the upper limit of 5.0 is exceeded, it causes the first transmitting surface 11 to come too close to the axis 1 of rotational symmetry. This in turn causes interferences of that surface with the first reflecting surface 12, or the curvature of the first transmitting surface 11 in the direction orthogonal to the center axis 1 to grow too large with the result that coma in the meridional direction goes worse.

It is also preferable to satisfy the following condition (3):

$$0.35 < |C1x/C3x| < 2.0 \qquad (3)$$

Condition (3) defines the ratio of the curvatures of the sections of the first transmitting surface 11 and the second reflecting surface 13 orthogonal to the center axis (the axis of rotational symmetry) 1 at their positions where the center chief ray strikes them: it is equivalent to the ratio of reciprocals of distances from the axis 1 of rotational symmetry to the sections orthogonal to that axis. As the lower limit of 0.35 is not reached, it causes the first transmitting surface 11 to be too away from the axis 1 of rotational symmetry as compared with the second reflecting surface 13, again rendering it impossible to gain a wide angle of view in the meridional direction. As the upper limit of 2.0 is exceeded, on the other hand, it causes the first transmitting surface 11 to come too close to the axis 1 of rotational symmetry. This in turn causes interferences of that surface with the second reflecting surface 13, or the curvature of the first transmitting surface 11 in the direction orthogonal to the center axis 1 to grow too large with the result that coma in the meridional direction goes worse.

It is further preferable to satisfy the following condition (4):

$$0.1 < |C2y/C3y| < 2.0 \qquad (4)$$

Condition (4) represents the ratio of curvatures of the first reflecting surface 12 and the second reflecting surface 13 in the meridional section: it is equivalent to an angular magnification when only the meridional section of the front unit 10 is taken as being an afocal system. As the lower limit of 0.1 is not reached, it causes the curvature of the meridional section of the second reflecting surface to grow too large to correct aberrations. As the upper limit of 2.0 is exceeded, it causes the angle of view on the exit side of the front unit 10 to grow too wide, imposing too large loads on the rear unit 20.

It is further preferable to satisfy the following condition (5):

$$0.1 < |C2x/C3x| < 2.0 \qquad (5)$$

Condition (5) defines the ratio of the curvatures of the sections of the first reflecting surface 12 and the second reflecting surface 13 orthogonal to the center axis (axis of rotational symmetry) 1 at their positions where the center chief ray 2₀ strikes them: it is equivalent to the ratio of reciprocals of distances from the axis 1 of rotational symmetry to the sections orthogonal to that axis. As the lower limit of 0.1 is not reached, it causes the first reflecting surface 12 to be too away from the axis 1 of rotational symmetry as compared with the second reflecting surface 13, rendering it impossible to gain the effective diameter of the second reflecting surface 13 and a wide angle of view in the meridional direction. As the upper limit of 2.0 is exceeded, on the other hand, it causes the curvature of the second reflecting surface 13 to become too small with the result that the distance of the second reflecting surface 13 from the axis 1 of rotational symmetry grows too large to keep the optical system small.

Tabulated below are the values of η, C1y, C1x, C2y, C2x, C3y, C3x, C1x/C2x, C1x/C3x, C2y/C3y and C2x/X3x in Examples 1 to 4 given later.

|  | Example 1 | Example 2 | Example 3 | Example 4 |
|---|---|---|---|---|
| η | 4.913 | 5.374 | 3.552 | 9.640 |
| C1y | −0.0025 | −0.0018 | −0.0037 | −0.0434 |
| C1x | −0.1120 | −0.1156 | −0.1226 | −0.1557 |
| C2y | −0.0362 | −0.0360 | −0.0347 | −0.0717 |
| C2x | 0.0648 | 0.0652 | 0.0596 | 0.1198 |
| C3y | 0.1079 | 0.1048 | 0.1377 | 0.1685 |
| C3x | −0.2040 | −0.1855 | −0.2297 | −0.4038 |
| C1x/C2x | −0.3354 | −0.3436 | −0.2523 | −0.4255 |
| C1x/C3x | −0.3178 | −0.3514 | −0.2596 | −0.2966 |
| C2y/C3y | −1.7277 | −1.7745 | −2.0559 | −1.2997 |
| C2x/X3x | 0.5491 | 0.6236 | 0.5336 | 0.3855 |

The optical system of the invention is now explained more specifically with reference to Examples 1, 2, 3 and 4. Although will be enumerated later, the constructional parameters in these examples have been determined on the results of normal ray tracing from the object plane to the image plane 30 via the front unit 10 and the rear unit 20, as shown typically in FIG. 1.

For a coordinate system, assume that, in normal ray tracing as shown typically in FIG. 1, the origin of a decentered optical surface in a decentered optical system is defined by a position of projection of an entrance pupil 6Y onto the rotationally symmetric axis (center axis) 1, the Y-axis positive direction by a direction from the rotationally symmetric axis (center axis) 1 away from the image plane 30, and the Y-Z plane is defined by the paper plane of FIG. 1. Further, the Z-axis positive direction is defined by a direction opposite to the entrance pupil 6Y now assumed to lie in the paper plane of FIG. 1, and the X-axis positive direction by an axis that forms with the Y- and Z-axes a right-handed orthogonal coordinate system.

Given for the decentered surface are the amount of decentration of that surface from the center of the origin of the aforesaid optical system on a coordinate system on which that surface is defined (X, Y and Z are indicative of the X-axis direction, the Y-axis direction, and the Z-axis direction, respectively), and the angles of tilt (α, β, γ (°)) of the coordinate systems for defining the surfaces with the centers on the X-, Y- and Z-axes, respectively. In that case, the positive for α and β means counterclockwise rotation with respect to the positive directions of the respective axes, and the positive for γ means clockwise rotation with respect to the positive direction of the Z-axis. Referring here to how to perform α-, β- and γ-rotations of the center axis of the surface, the coordinate system that defines each surface is first α-rotated counterclockwise about the X-axis of the coordinate system that is defined at the origin of the optical system. Then, the coordinate system is β-rotated counterclockwise about the Y-axis of the rotated new coordinate system. Finally, the coordinate system is γ-rotated clockwise about the Z-axis of the rotated new another coordinate system.

When, of optical surfaces forming the optical system of each example, a specific surface and the subsequent surface form together a co-axial optical system, there is a surface-to-surface space given. Besides, the radius of curvature of each surface and the refractive index and Abbe constant of the medium are given as usual.

It is noted that the term with respect to aspheric surfaces on which no data are mentioned in the constructional parameters, given later, is zero. Refractive indices and Abbe constants are given on a d-line (587.56 nm wavelength) basis, and length in mm. The decentration of each surface is given in terms of the amount of decentration from the position of projection of the entrance pupil 6Y onto the axis 1 of rotational symmetry (center axis).

It is noted that the aspheric surface is a rotationally symmetric aspheric surface given by the following defining formula.

$$Z=(Y^2/R)/[1+\{1-(1+k)Y^2/R^2\}^{1/2}]+aY^4+bY^6+cY^8+dY^{10}+ \quad (a)$$

where Z is the optical axis with the proviso that Y is taken in the direction vertical to the optical axis, R is a paraxial radius of curvature, K is a conic constant, and a, b, c, d, ... are the fourth-, the sixth-, the eighth-, and the tenth-order aspheric coefficients. The Z-axis in this defining formula becomes the axis of the rotationally symmetric aspheric surface.

In this conjunction, an extended rotation free-form surface is a rotationally symmetric surface given by the following definition.

First, the following curve (b) passing through the origin on the Y-Z coordinate plane is determined.

$$Z=(Y^2/RY)/[1+\{1-(C_1+1)Y^2/RY^2\}^{1/2}]\,C_2Y+C_3Y^2+ \\ C_4Y^3+C_5Y^4+C_6Y^5+C_7Y^6+\ldots+C_{21}Y^{20}+\ldots \\ C_{n+1}Y^n \quad (b)$$

Then, a curve F(Y) is determined by the rotation through an angle θ (°) of that curve (b) in the X-axis positive direction provided that the counterclockwise direction is taken as positive. This curve F(Y), too, passes through the origin on the Y-Z coordinate plane.

The extended rotation free-form surface is defined by a rotationally symmetric surface obtained by parallel translation of that curve F(Y) by a distance R in the Z-positive direction (in the Z-negative direction when R is negative), and then rotation of the parallel translated curve about the Y-axis.

As a result, the extended rotation free-form surface becomes a free-form surface (free-form curve) in the Y-Z plane, and a circle with a radius |R| in the X-Z plane.

From this definition, the Y-axis becomes the axis of the extended rotation free-form surface.

Here, RY is the radius of curvature of the spherical term in the Y-Z section, $C_1$ is a conic constant, and $C_2, C_3, C_4, C_5$, etc. are the aspheric coefficients of first, second, third, and fourth order, respectively.

In the optical system of the invention, it is preferable that at least one reflecting surface in the front unit 10 is composed of such an extended rotation free-form surface, and when expressed by a polynomial in the Y-Z section, it is of rotationally symmetric shape formed by the rotation about the center axis 1 of a line segment of any arbitrary shape having at least an odd-number order term with no symmetric plane. By allowing at least one reflecting surface to have such surface shape, it is possible to provide an optical system of improved resolving power, wherein decentration aberrations unavoidably associated with a reflecting optical system are corrected, and to reduce the size of that optical system.

EXAMPLE 1

FIG. 1 is a sectional view of the optical system of Example 1, as taken along a center axis 1 (the axis of rotational symmetry), and FIG. 2 is a plan view of an optical path taken through that optical system. Note here that FIG. 2 shows an optical path taken by light coming from the azimuth direction of 0° plus an optical path taken by light coming from an azimuth direction of ±10°.

The optical system of this example is made up of a front unit 10 rotationally symmetric about the center axis 1, a rear unit 20 rotationally symmetric about the center axis 1, and an aperture 5 located between the front unit 10 and the rear unit 20 coaxially with the center axis 1. A light beam 2 coming from a far away object passes through the front unit 10 and the rear unit 20 in order, forming an image at a position of an image plane 30 that is vertical to and off the center axis 1. When the center axis 1 is set vertically, an annular image which has typically a full-360° (full-panoramic) angle of view, and whose zenithal direction lies in the center direction of the image and whose horizon lies outside, is formed on the image plane 30.

The front unit 10 is made up of a resin or other transparent medium that is rotationally symmetric about the center axis 1 and has a refractive index of 1 or greater and has two internal reflecting surfaces 12 and 13 and two transmitting surfaces 11 and 14, each of shape rotationally symmetric about the center axis 1. The rear unit 20 is made up of a lens system that includes 5 lenses L1 to L5 in a four-group form.

The transparent medium of the front unit 10 is made up of the first transmitting surface 11, the first reflecting surface 12, the second reflecting surface 13 and the second transmitting surface 14: the first transmitting surface 11 is located on an object side with respect to the center axis 1, the first reflecting surface 12 is located in opposition to the first transmitting surface 11 with the center axis 1 between them and more on the image plane 30 side than the first transmitting surface 11, the second reflecting surface 13 is located on the same side as the first transmitting surface 11 with respect to the center axis 1 and more in opposition to the image plane 30 than the first transmitting surface 11, and the second transmitting surface 14 is located more on the image plane 30 side than the first transmitting surface 11.

And, a light beam 2 coming from afar enters the transparent medium through the first transmitting surface 11. Then, it is reflected at the first reflecting surface 12 located in opposition to the first transmitting surface 11 with the center axis 1 between them in a direction away from the image plane 30, and reflected at the second reflecting surface 13 located on the same side as the first transmitting surface 11 with respect to the center axis 1 in a direction toward the image plane 30 side, leaving the transparent medium through the second transmitting surface 14. Then, the reflected light is imaged at a radially given position of the image plane 30 off the center axis 1 via the stop-forming round aperture 5 located between the front unit 10 and the rear unit 20 coaxially with the center axis 1, and the rear unit 20 of positive power. The first transmitting surface 11, the first reflecting surface 12, and the second reflecting surface 13 of the front unit 10 is formed of an extended rotation free-form surface provided that the conic coefficient $C_1$ and the aspheric coefficients $C_2, C_3, C_4, C_5 \ldots$ are all zero, and the second transmitting surface 14 is formed of a rotationally symmetric aspheric surface with the vertex lying on the center axis 1.

The lens system forming the rear unit 20 is made up of, in order from the front unit 10 side, a double-convex positive lens L1, a cemented lens of a double-concave negative lens L2 and a double-convex positive lens L3, a double-convex positive lens L4 and a double-convex positive lens L5.

When the center axis 1 lies in the vertical direction and the image plane 30 directs to the zenith, the center light beam 2 coming from afar in a direction at an angle of elevation of 45° enters the transparent medium of the front unit 10 after refracted through the entrance or first transmitting surface 11. Then, it is reflected at the first 12 and the second reflecting surface 13 in order, and refracted through the second transmitting surface 14, leaving the transparent medium of the front unit 10. Then, the refracted light enters the rear unit 20 via the aperture 5, forming an image at a radially given position of the image plane 30 off the center axis 1.

With the optical system here, the aperture (stop) 5 positioned between the front unit 10 and the rear unit 20 is projected onto the object side so that in the meridional section, the light is once imaged as an image 6Y that is again back projected to form an entrance pupil 6Y near the first transmitting surface 11 and near the second reflecting surface 13. In the sagittal section, on the other hand, the light is twice imaged as images 6X and 6X on the center axis (the axis of rotational symmetry) 1 to form an entrance pupil 6X on the center axis 1.

And in the optical system here, light beams 2, 3U and 3L (3U is the light beam coming from a far away place in the sky, and 3L is the light beam coming from a far away place on the ground) coming from afar and through the entrance pupil 6Y are once imaged at a position $4Y_1$ between the first 12 and the second reflecting surface 13 in the section including the center axis 1 (the meridional section: FIG. 1); they are again imaged at a position $4Y_2$ close to the second reflecting surface 13 between the second reflecting surface 13 and the second transmitting surface 14; and they are twice imaged at a position $4X_1$ near the first reflecting surface and a position $4X_2$ between the second reflecting surface 13 and the second transmitting surface 14 in the section that is orthogonal to the section including the center axis 1 and contains the center ray $2_0$ of each light beam (the sagittal section: FIG. 2).

The specifications of Example 1 are:
Horizontal angle of view: 360°
Vertical angle of view: 90° (the center angle of view: 45° (the angle of elevation)),
Entrance pupil diameter: 0.484 mm,
Focal Length: 0.905 mm, and
Image size: φ1.756 to φ6.045 mm.

The optical system of Example 1 having the image plane 30 located parallel with the ground is preferably used at an angle of view set up at the sky.

Figure 3:
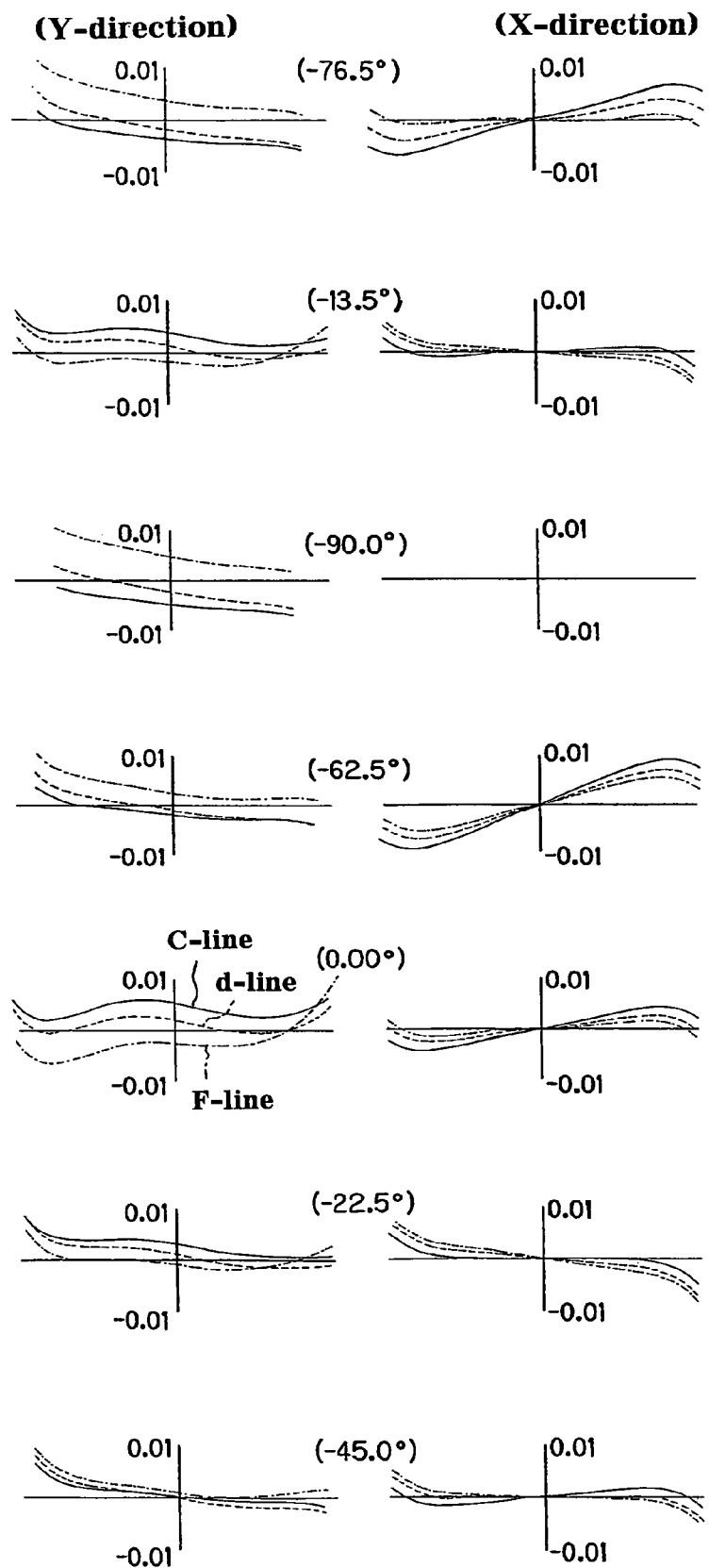
FIG. 3 is a transverse aberration diagram for the whole optical system of Example 1.

FIG. 3 is a transverse diagram for the whole optical system according to Example 1, wherein the angles at the center stand for vertical angles of view and Y-direction (meridional) and X-direction (sagittal) transverse aberrations at those angles are shown. Throughout the disclosure, the positive angle of view is indicative of an angle of depression and the negative angle of view is indicative of an angle of elevation.

Figure 4:
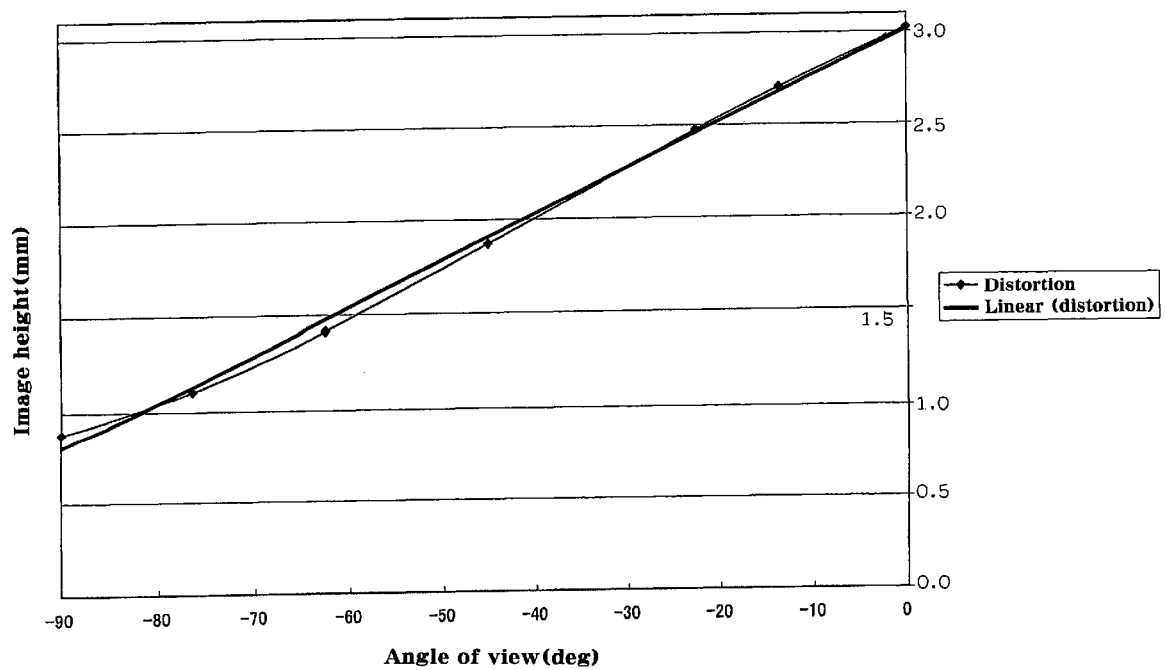
FIG. 4 is indicative of distortion of Example 1 in the vertical direction.

FIG. 4 is indicative of distortion in the vertical direction of Example 1, with a curve knotted by ♦ indicative of a graph obtained by plotting image heights at the image plane (image heights from the center axis 1 in the radial direction) with respect to the vertical entrance angle of view of the optical system of Example 1. In FIG. 4, a thick solid line represents a case where the image height is proportional to the entrance angle of view (IH f·θ where IH is the image height, f is the focal length and θ is the angle of view).

EXAMPLE 2

Figure 5:
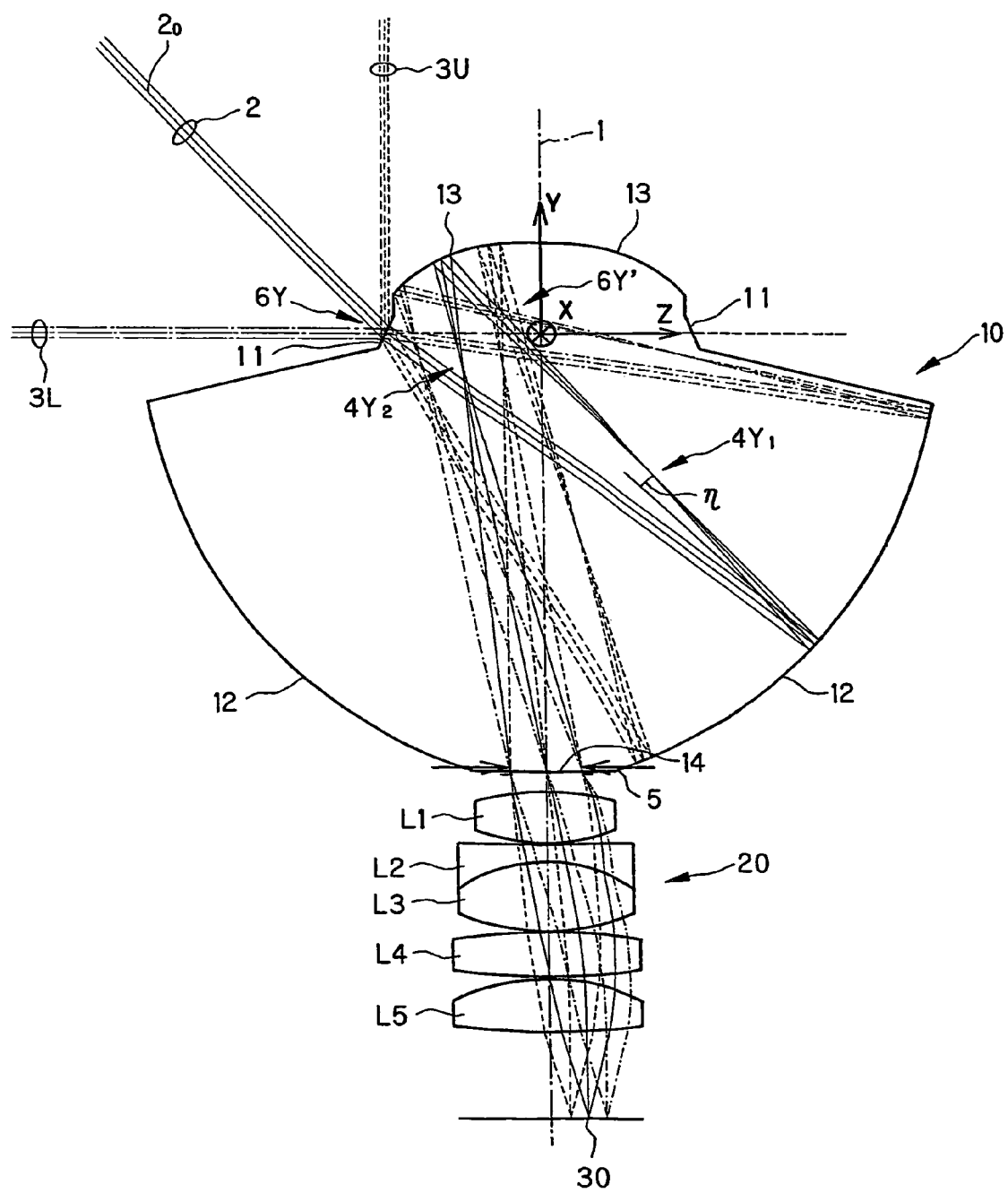
FIG. 5 is a sectional view of the optical system according to Example 2 of the invention, as taken along the center axis.
Figure 6:
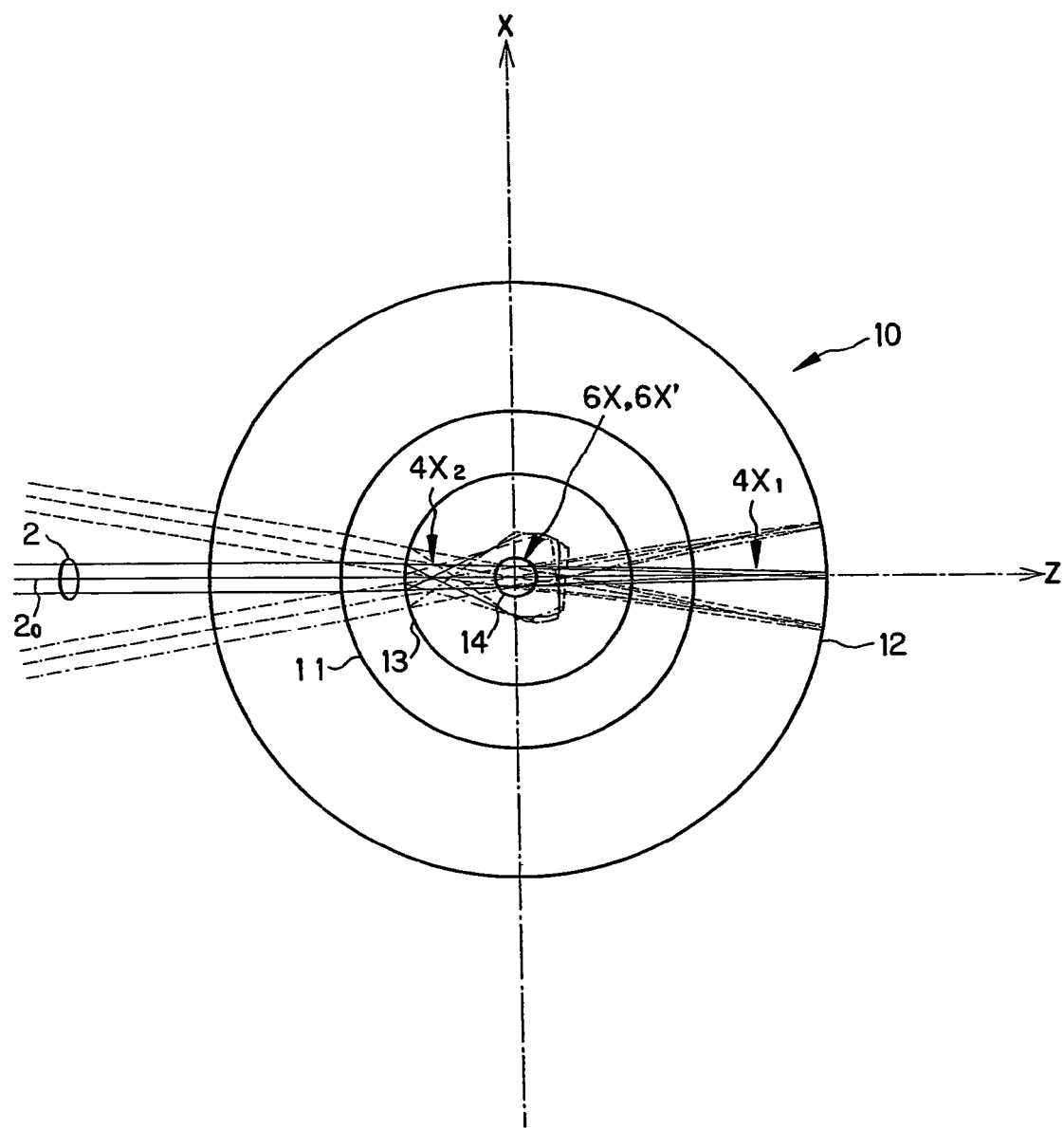
FIG. 6 is a plan view of an optical path through the optical system according to Example 2 of the invention.

FIG. 5 is a sectional view of the optical system of Example 2, as taken along a center axis 1 (the axis of rotational symmetry), and FIG. 6 is a plan view, as in FIG. 2, of an optical path through that optical system.

The optical system of this example is made up of a front unit 10 rotationally symmetric about the center axis 1, a rear unit 20 rotationally symmetric about the center axis 1, and an aperture 5 located between the front unit 10 and the rear unit 20 coaxially with the center axis 1. A light beam 2 coming from a far away object passes through the front unit 10 and the rear unit 20 in order, forming an image at a position of an image plane 30 that is vertical to and off the center axis 1. When the center axis is set vertically, an annular image which has typically a full-360° (full-panoramic) angle of view, and whose zenithal direction lies in the center direction of the image and whose horizon lies outside, is formed on the image plane 30.

The front unit 10 is made up of a resin or other transparent medium that is rotationally symmetric about the center axis 1 and has a refractive index of 1 or greater and has two internal reflecting surfaces 12 and 13 and two transmitting surfaces 11 and 14, each of shape rotationally symmetric about the center axis 1. The rear unit 20 is made up of a lens system that includes 5 lenses L1 to L5 in a four-group form.

The transparent medium of the front unit 10 is made up of the first transmitting surface 11, the first reflecting surface 12, the second reflecting surface 13 and the second transmitting surface 14: the first transmitting surface 11 is located on an object side with respect to the center axis 1, the first reflecting surface 12 is located in opposition to the first transmitting surface 11 with the center axis 1 between them and more on the image plane 30 side than the first transmitting surface 11, the second reflecting surface 13 is located on the same side as the first transmitting surface 11 with respect to the center axis 1 and more in opposition to the image plane 30 than the first transmitting surface 11, and the second transmitting surface 14 is located more on the image plane 30 side than the first transmitting surface 11.

And, a light beam 2 coming from afar enters the transparent medium through the first transmitting surface 11. Then, it is reflected at the first reflecting surface 12 located in opposition to the first transmitting surface 11 with the center axis 1 between them in a direction away from the image plane 30, and reflected at the second reflecting surface 13 located on the same side as the first transmitting surface 11 with respect to the center axis 1 in a direction toward the image plane 30 side, leaving the transparent medium through the second transmitting surface 14. Then, the reflected light is imaged at a radially given position of the image plane 30 off the center axis 1 via the stop-forming round aperture 5 located between the front unit 10 and the rear unit 20 coaxially with the center axis 1, and the rear unit 20 of positive power. The first transmitting surface 11, the first reflecting surface 12, and the second reflecting surface 13 of the front unit 10 is formed of an extended rotation free-form surface provided that the conic coefficient $C_1$ and the aspheric coefficients $C_2, C_3, C_4, C_5$ ... are all zero, and the second transmitting surface 14 is formed of a rotationally symmetric aspheric surface with the vertex lying on the center axis 1.

The lens system forming the rear unit 20 is made up of, in order from the front unit 10 side, a double-convex positive lens L1, a cemented lens of a double-concave negative lens L2 and a double-convex positive lens L3, a double-convex positive lens L4 and a double-convex positive lens L5.

When the center axis 1 lies in the vertical direction and the image plane 30 directs to the zenith, the center light beam 2 coming from afar in a direction at an angle of elevation of 45° enters the transparent medium of the front unit 10 after refracted through the entrance or first transmitting surface 11. Then, it is reflected at the first 12 and the second reflecting surface 13 in order, and refracted through the second transmitting surface 14, leaving the transparent medium of the front unit 10. Then, the refracted light enters the rear unit 20 via the aperture 5, forming an image at a radially given position of the image plane 30 off the center axis 1.

With the optical system here, the aperture (stop) 5 positioned between the front unit 10 and the rear unit 20 is projected onto the object side so that in the meridional section, the light is once imaged as an image 6Y that is again back projected to form an entrance pupil 6Y near the first transmitting surface 11 and near the second reflecting surface 13 of the front unit 10. In the sagittal section, on the other hand, the light is twice imaged as images 6X and 6X on the center axis (the axis of rotational symmetry) 1 to form an entrance pupil 6X on the center axis 1.

And in the optical system here, light beams 2, 3U and 3L coming from afar and through the entrance pupil 6Y are once imaged at a position $4Y_1$ between the first 12 and the second reflecting surface 13 in the section including the center axis 1 (the meridional section: FIG. 5); they are again imaged at a position $4Y_2$ close to the second reflecting surface 13 between the second reflecting surface 13 and the second transmitting surface 14; and they are twice imaged at a position $4X_1$ near the first reflecting surface and a position $4X_2$ between the second reflecting surface 13 and the second transmitting surface 14 in the section that is orthogonal to the section including the center axis 1 and contains the center ray $2_0$ of each light beam (the sagittal section: FIG. 6).

The specifications of Example 2 are:
Horizontal angle of view: 360°
Vertical angle of view: 90° (the center angle of view: 45° (the angle of elevation)),
Entrance pupil diameter: 0.469 mm,
Focal length: 0.847 mm, and
Image size: φ1.999 to φ5.999 mm.

The optical system of Example 2 having the image plane 30 located parallel with the ground is preferably used at an angle of view set up at the sky.

Figure 7:
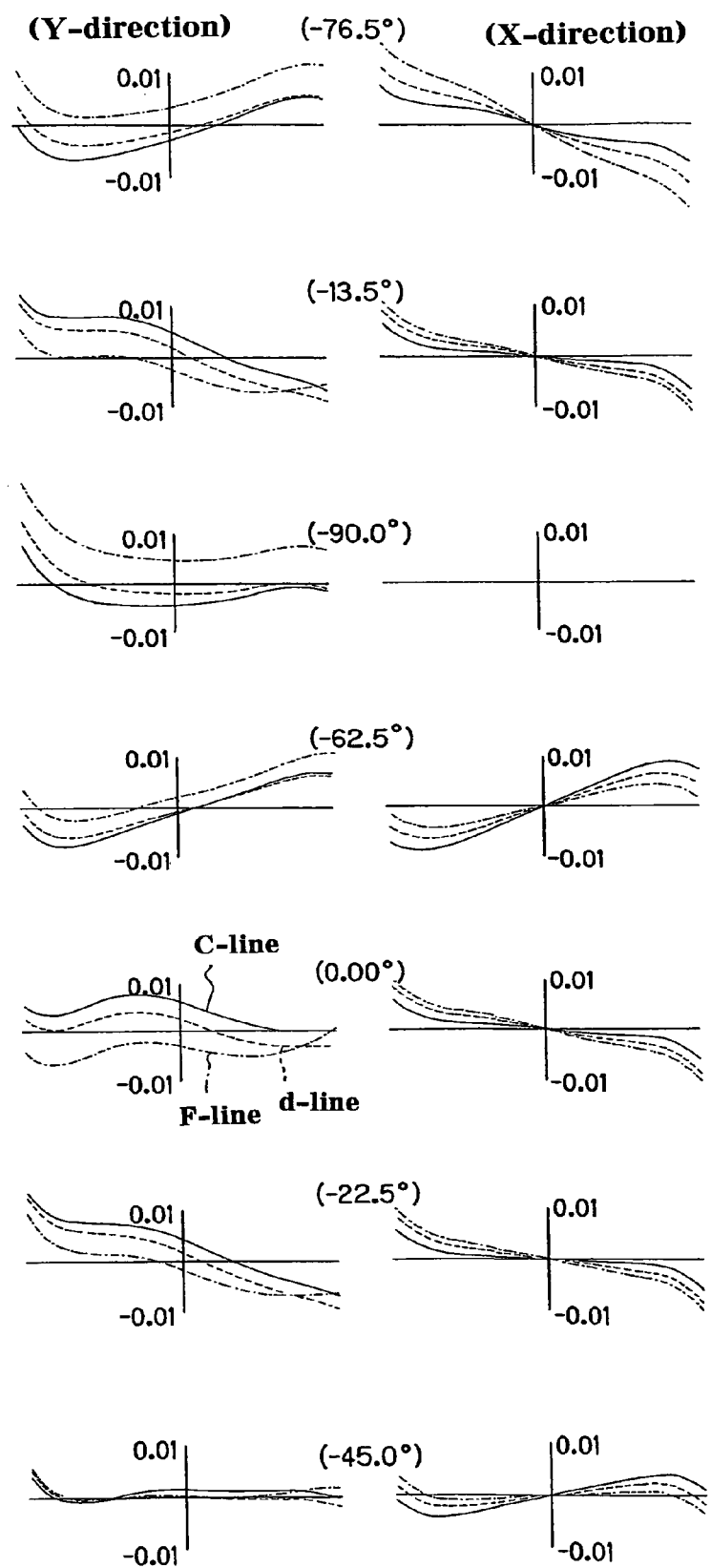
FIG. 7 is a transverse aberration diagram for the whole optical system of Example 2.
Figure 8:
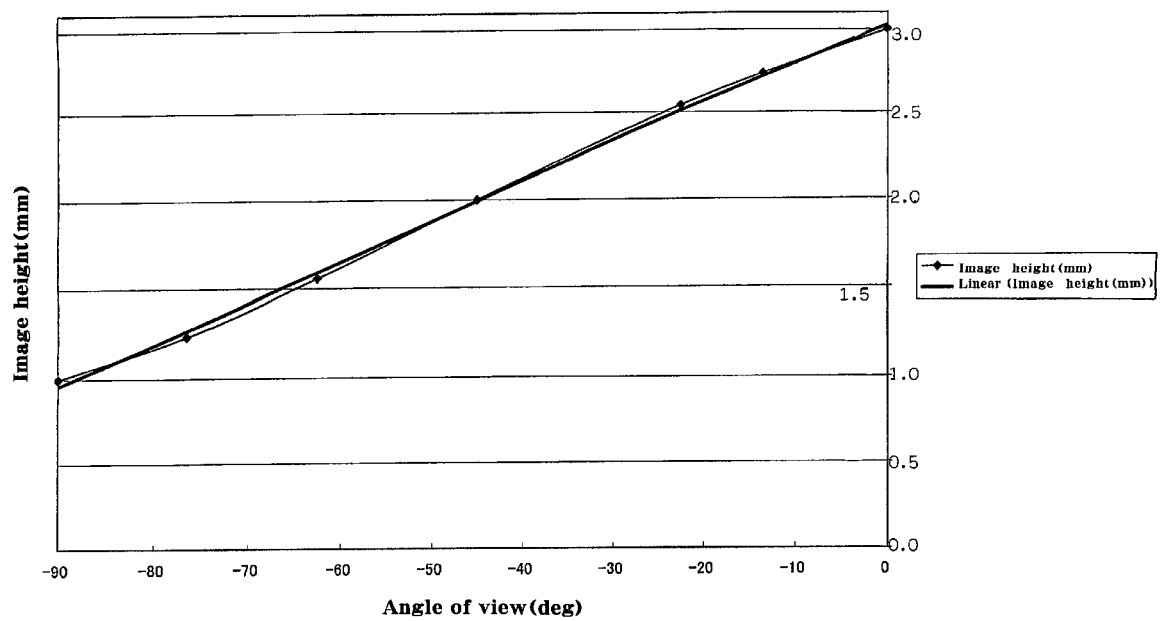
FIG. 8 is indicative of distortion of Example 2 in the vertical direction.

FIG. 7 is illustrative of transverse aberrations for the whole optical system of Example 2, and FIG. 8 is indicative of distortion in the vertical direction of Example 2.

EXAMPLE 3

Figure 9:
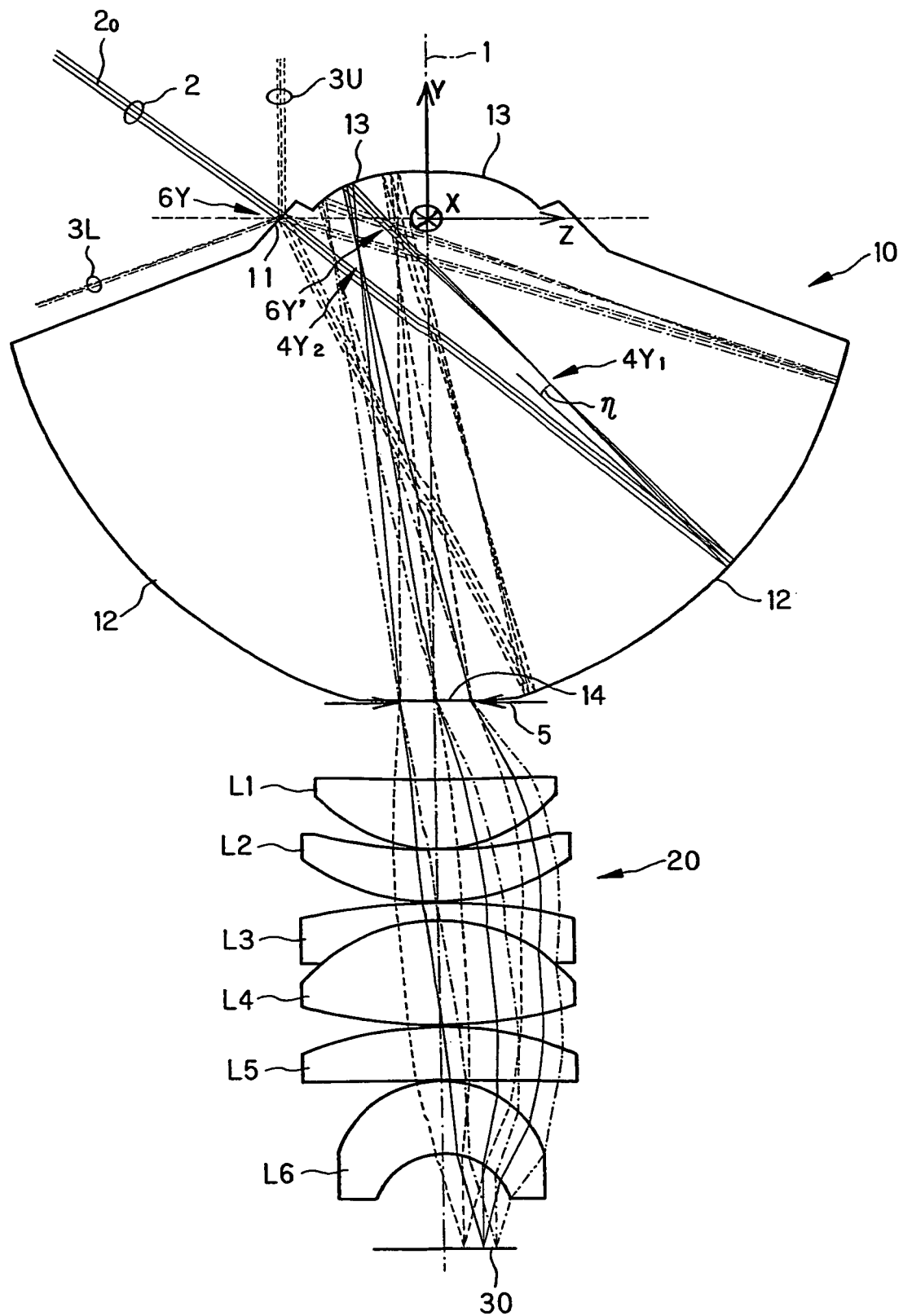
FIG. 9 is a sectional view of the optical system according to Example 3 of the invention, as taken along the center axis.
Figure 10:
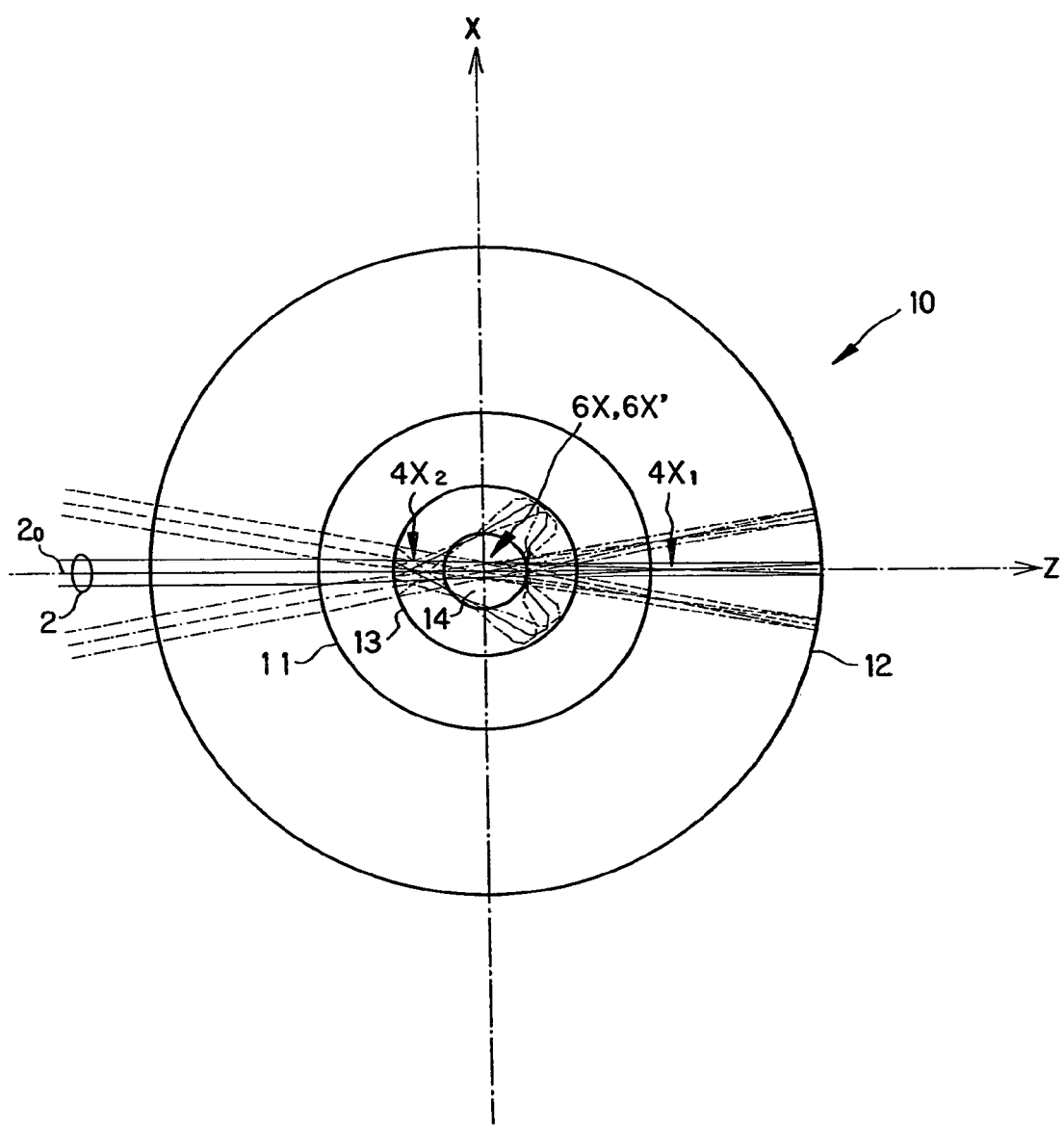
FIG. 10 is a plan view of an optical path through the optical system according to Example 3 of the invention.

FIG. 9 is a sectional view of the optical system of Example 3, as taken along a center axis 1 (the axis of rotational symmetry), and FIG. 10 is a plan view, as in FIG. 2, of an optical path through that optical system.

The optical system of this example is made up of a front unit 10 rotationally symmetric about the center axis 1, a rear unit 20 rotationally symmetric about the center axis 1, and an aperture 5 located between the front unit 10 and the rear unit 20 coaxially with the center axis 1. A light beam 2 coming from a far away object passes through the front unit 10 and the rear unit 20 in order, forming an image at a position of an image plane 30 that is vertical to and off the center axis 1.

When the center axis is set vertically, an annular image which has typically a full-360° (full-panoramic) angle of view, and whose zenithal direction lies in the center direction of the image and whose horizon lies outside, is formed on the image plane 30.

The front unit 10 is made up of a resin or other transparent medium that is rotationally symmetric about the center axis 1 and has a refractive index of 1 or greater and has two internal reflecting surfaces 12 and 13 and two transmitting surfaces 11 and 14, each of shape rotationally symmetric about the center axis 1. The rear unit 20 is made up of a lens system that includes 6 lenses L1 to L6 in a five-group form.

The transparent medium of the front unit 10 is made up of the first transmitting surface 11, the first reflecting surface 12, the second reflecting surface 13 and the second transmitting surface 14: the first transmitting surface 11 is located on an object side with respect to the center axis 1, the first reflecting surface 12 is located in opposition to the first transmitting surface 11 with the center axis 1 between them and more on the image plane 30 side than the first transmitting surface 11, the second reflecting surface 13 is located on the same side as the first transmitting surface 11 with respect to the center axis 1 and more in opposition to the image plane 30 than the first transmitting surface 11, and the second transmitting surface 14 is located more on the image plane 30 side than the first transmitting surface 11.

And, a light beam 2 coming from afar enters the transparent medium through the first transmitting surface 11. Then, it is reflected at the first reflecting surface 12 located in opposition to the first transmitting surface 11 with the center axis 1 between them in a direction away from the image plane 30, and reflected at the second reflecting surface 13 located on the same side as the first transmitting surface 11 with respect to the center axis 1 in a direction toward the image plane 30 side, leaving the transparent medium through the second transmitting surface 14. Then, the reflected light is imaged at a radially given position of the image plane 30 off the center axis 1 via the stop-forming round aperture 5 located between the front unit 10 and the rear unit 20 coaxially with the center axis 1, and the rear unit 20 of positive power. The first transmitting surface 11, the first reflecting surface 12, and the second reflecting surface 13 of the front unit 10 is formed of an extended rotation free-form surface provided that the conic coefficient $C_1$ and the aspheric coefficients $C_2$, $C_3$, $C_4$, $C_5$ ... are all zero, and the second transmitting surface 14 is formed of a rotationally symmetric aspheric surface with the vertex lying on the center axis 1.

The lens system forming the rear unit 20 is made up of, in order from the front unit 10 side, a positive meniscus lens L1 concave on its front unit 10 side, a positive meniscus lens L2 concave on its front unit 10 side, a cemented lens of a negative meniscus lens L3 convex on its front unit 10 side and a double-convex positive lens L4, a positive meniscus lens L5 concave on its image plane 30 side, and a negative meniscus lens L6 concave on its image plane 30 side.

When the center axis 1 lies in the vertical direction and the image plane 30 directs to the zenith, the center light beam 2 coming from afar in a direction at an angle of elevation of 45° enters the transparent medium of the front unit 10 after refracted through the entrance or first transmitting surface 11. Then, it is reflected at the first 12 and the second reflecting surface 13 in order, and refracted through the second transmitting surface 14, leaving the transparent medium of the front unit 10. Then, the refracted light enters the rear unit 20 via the aperture 5, forming an image at a radially given position of the image plane 30 off the center axis 1.

With the optical system here, the aperture (stop) 5 positioned between the front unit 10 and the rear unit 20 is projected onto the object side so that in the meridional section, the light is once imaged as an image 6Y that is again back projected to form an entrance pupil 6Y near the first transmitting surface 11 and near the second reflecting surface 13 of the front unit 10. In the sagittal section, on the other hand, the light is twice imaged as images 6X and 6X on the center axis (the axis of rotational symmetry) 1 to form an entrance pupil 6X on the center axis 1.

And in the optical system here, light beams 2, 3U and 3L coming from afar and through the entrance pupil 6Y are once imaged at a position $4Y_1$ between the first 12 and the second reflecting surface 13 in the section including the center axis 1 (the meridional section: FIG. 9); they are again imaged at a position $4Y_2$ close to the second reflecting surface 13 between the second reflecting surface 13 and the second transmitting surface 14; and they are twice imaged at a position $4X_1$ near the first reflecting surface and a position $4X_2$ between the second reflecting surface 13 and the second transmitting surface 14 in the section that is orthogonal to the section including the center axis 1 and contains the center ray $2_0$ of each light beam (the sagittal section: FIG. 10).

The specifications of Example 3 are:
Horizontal angle of view: 360°
Vertical angle of view: 110° (the center angle of view: 35° (the angle of elevation)),
Entrance pupil diameter: 0.178 mm,
Focal length: 0.335 mm, and
Image size: $\phi 1.918$ to $\phi 5.656$ mm.

The optical system of Example 3 having the image plane 30 located parallel with the ground is preferably used at an angle of view set up at the sky.

Figure 11:
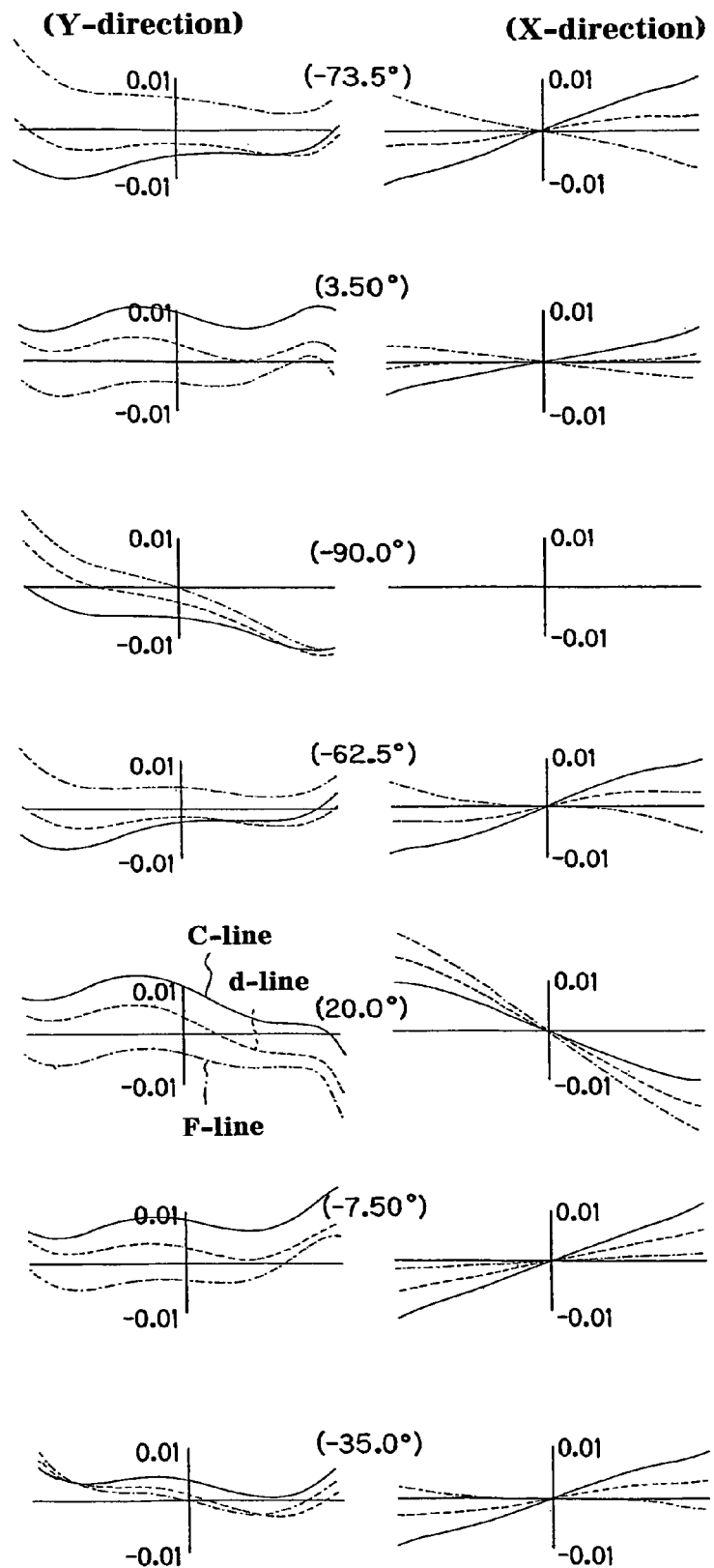
FIG. 11 is a transverse aberration diagram for the whole optical system of Example 3.
Figure 12:
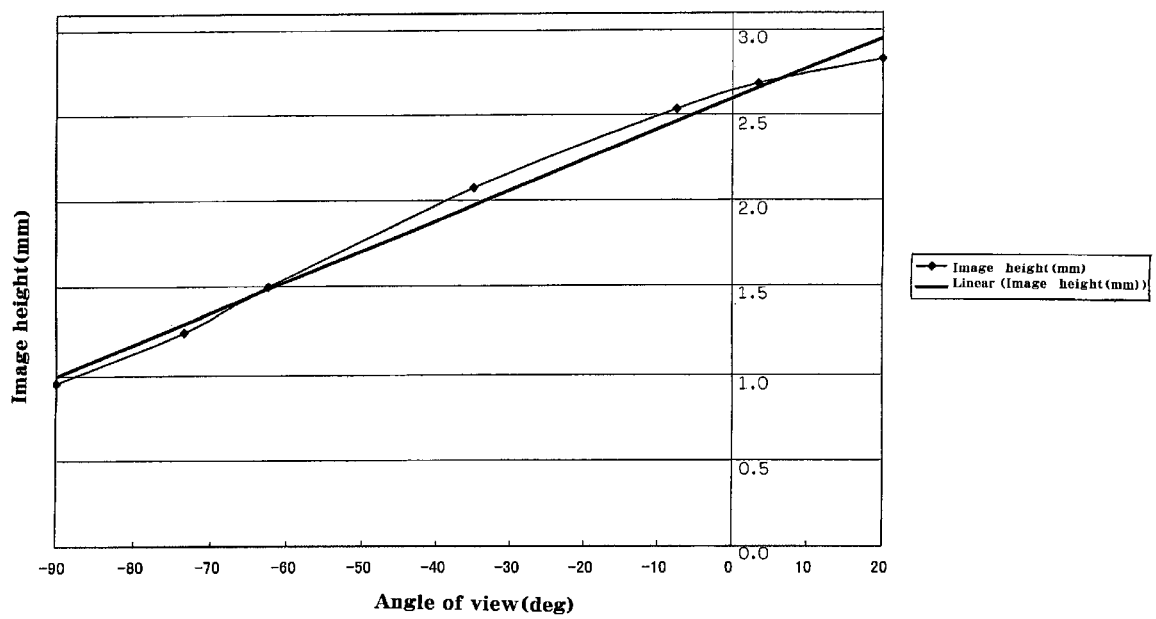
FIG. 12 is indicative of distortion of Example 3 in the vertical direction.

FIG. 11 is illustrative of transverse aberrations for the whole optical system of Example 3, and FIG. 12 is indicative of distortion in the vertical direction of Example 3.

EXAMPLE 4

Figure 13:
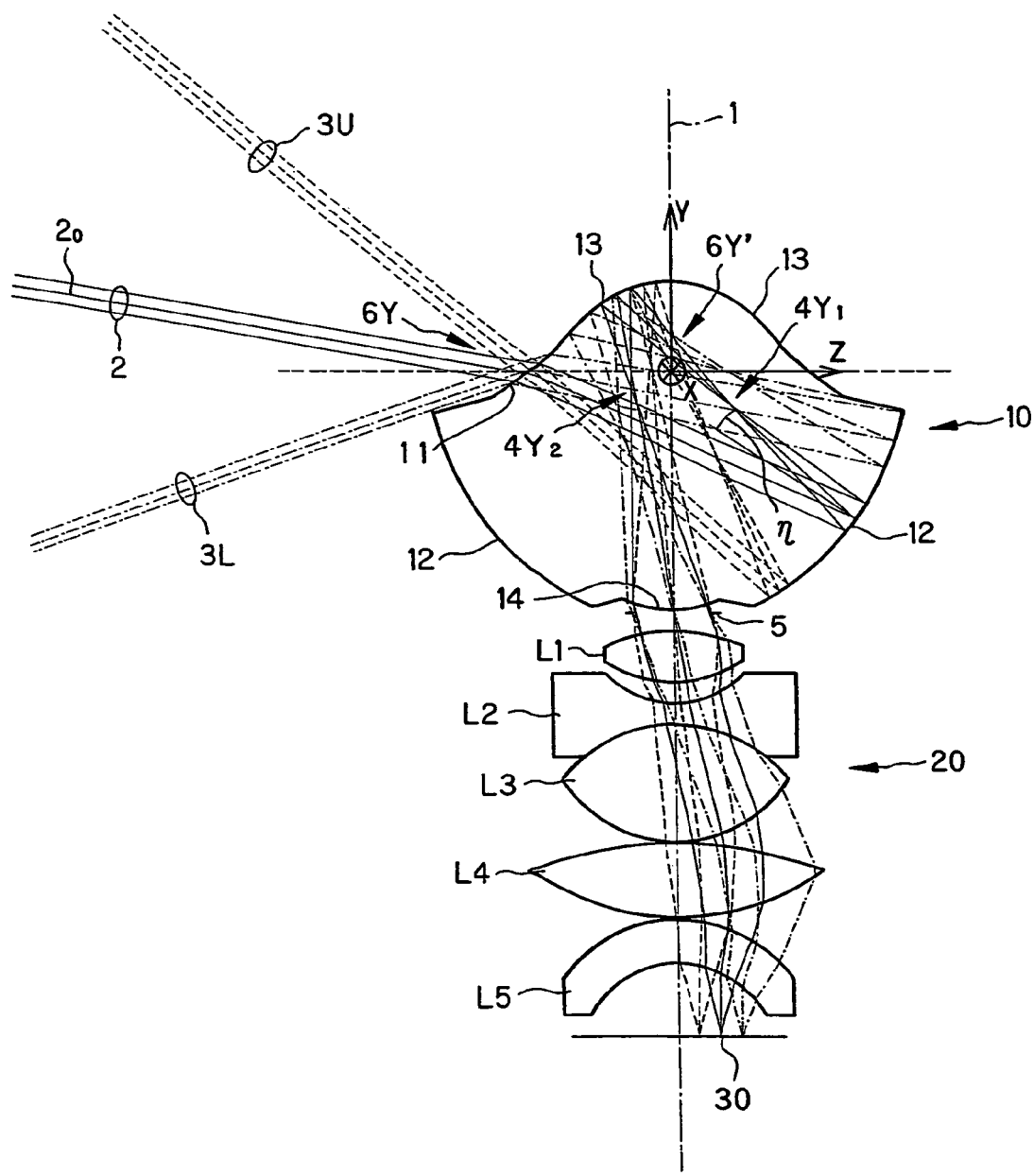
FIG. 13 is a sectional view of the optical system according to Example 4 of the invention, as taken along the center axis.
Figure 14:
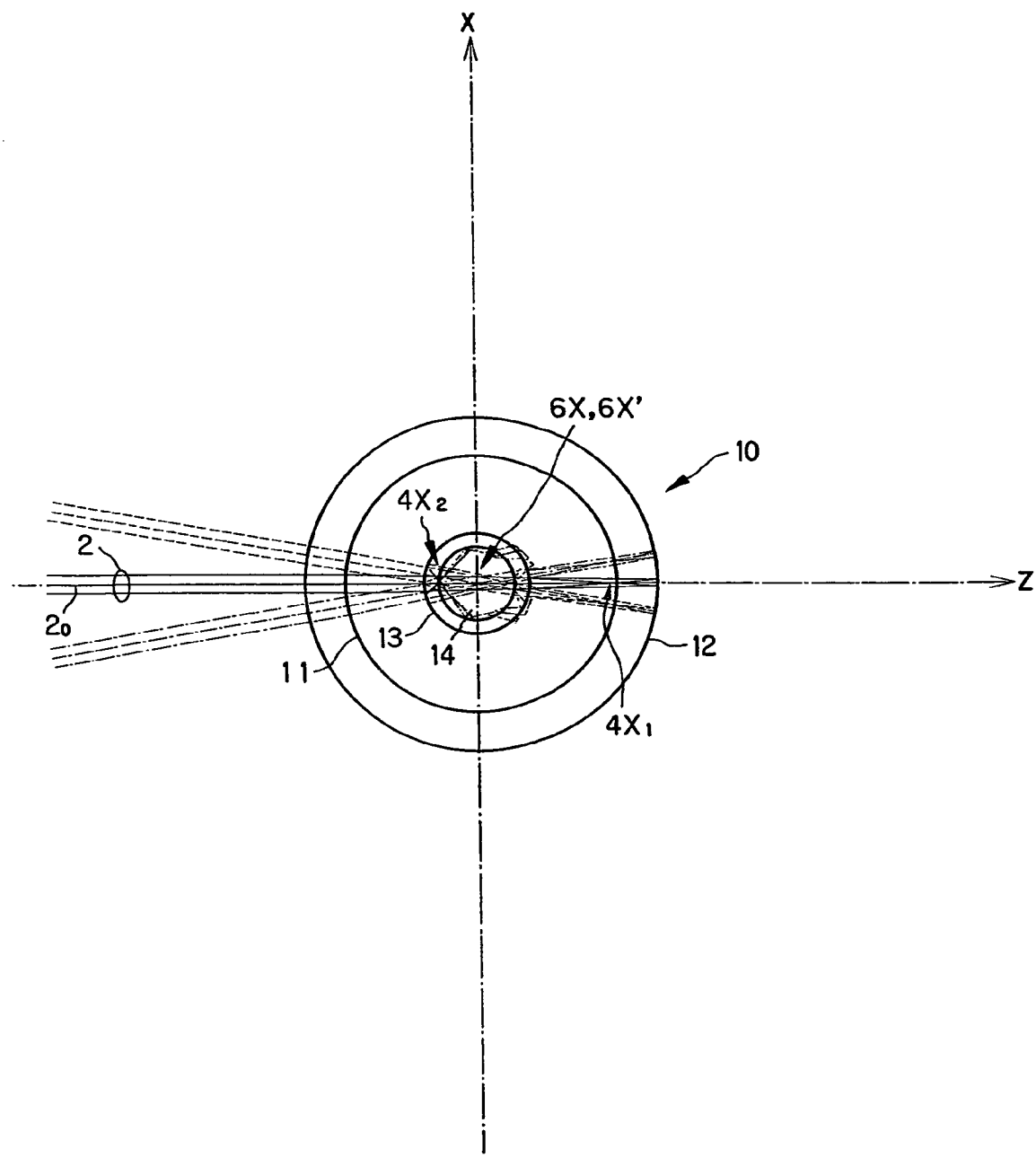
FIG. 14 is a plan view of an optical path through the optical system according to Example 4 of the invention.

FIG. 13 is a sectional view of the optical system of Example 4, as taken along a center axis (the axis of rotational symmetry) 1, and FIG. 14 is a plan view, as in FIG. 2, of an optical path through that optical system.

The optical system of this example is made up of a front unit 10 rotationally symmetric about the center axis 1, a rear unit 20 rotationally symmetric about the center axis 1, and an aperture 5 located between the front unit 10 and the rear unit 20 coaxially with the center axis 1. A light beam 2 coming from a far away object passes through the front unit 10 and the rear unit 20 in order, forming an image at a position of an image plane 30 that is vertical to and off the center axis 1. When the center axis is set vertically, an annular image which has typically a full-360° (full-panoramic) angle of view, and whose zenithal direction lies in the center direction of the image and whose horizon lies outside, is formed on the image plane 30.

The front unit 10 is made up of a resin or other transparent medium that is rotationally symmetric about the center axis 1 and has a refractive index of 1 or greater and has two internal reflecting surfaces 12 and 13 and two transmitting surfaces 11 and 14, each of shape rotationally symmetric about the center axis 1. The rear unit 20 is made up of a lens system that includes 5 lenses L1 to L5 in a four-group form.

The transparent medium of the front unit 10 is made up of the first transmitting surface 11, the first reflecting surface 12, the second reflecting surface 13 and the second transmitting surface 14: the first transmitting surface 11 is located on an object side with respect to the center axis 1, the first reflecting surface 12 is located in opposition to the first transmitting surface 11 with the center axis 1 between them and more on the image plane 30 side than the first transmitting surface 11, the second reflecting surface 13 is located on the same side as the first transmitting surface 11 with respect to the center axis 1 and more in opposition to the image plane 30 than the first transmitting surface 11, and the second transmitting surface 14 is located more on the image plane 30 side than the first transmitting surface 11.

And, a light beam 2 coming from afar enters the transparent medium through the first transmitting surface 11. Then, it is reflected at the first reflecting surface 12 located in opposition to the first transmitting surface 11 with the center axis 1 between them in a direction away from the image plane 30, and reflected at the second reflecting surface 13 located on the same side as the first transmitting surface 11 with respect to the center axis 1 in a direction toward the image plane 30 side, leaving the transparent medium through the second transmitting surface 14. Then, the reflected light is imaged at a radially given position of the image plane 30 off the center axis 1 via the stop-forming round aperture 5 located between the front unit 10 and the rear unit 20 coaxially with the center axis 1, and the rear unit 20 of positive power. The first transmitting surface 11, the first reflecting surface 12, and the second reflecting surface 13 of the front unit 10 is formed of an extended rotation free-form surface provided that the conic coefficient $C_1$ and the aspheric coefficients $C_2, C_3, C_4, C_5 \ldots$ are all zero, and the second transmitting surface 14 is formed of a rotationally symmetric aspheric surface with the vertex lying on the center axis 1.

The lens system forming the rear unit 20 is made up of, in order from the front unit 10 side, a double-convex positive lens L1, a cemented lens of a double-concave negative lens L2 and a double-convex positive lens L3, a double-convex positive lens L4 and a negative meniscus lens L5 concave on its image plane 30 side.

When the center axis 1 lies in the vertical direction and the image plane 30 directs to the zenith, the center light beam 2 coming from afar in the horizontal direction (the angle of elevation is 0°) enters the transparent medium of the front unit 10 after refracted through the entrance or first transmitting surface 11. Then, it is reflected at the first 12 and the second reflecting surface 13 in order, and refracted through the second transmitting surface 14, leaving the transparent medium of the front unit 10. Then, the refracted light enters the rear unit 20 via the aperture 5, forming an image at a radially given position of the image plane 30 off the center axis 1.

With the optical system here, the aperture (stop) 5 positioned between the front unit 10 and the rear unit 20 is projected onto the object side so that in the meridional section, the light is once imaged as an image 6Y that is again back projected to form an entrance pupil 6Y near the first transmitting surface 11 and near the second reflecting surface 13 of the front unit 10. In the sagittal section, on the other hand, the light is twice imaged as images 6X and 6X on the center axis (the axis of rotational symmetry) 1 to form an entrance pupil 6X on the center axis 1.

And in the optical system here, light beams 2, 3U and 3L coming from afar and through the entrance pupil 6Y are once imaged at a position $4Y_1$ between the first 12 and the second reflecting surface 13 in the section including the center axis 1 (the meridional section: FIG. 13); they are again imaged at a position $4Y_2$ closer to the second reflecting surface 13 between the second reflecting surface 13 and the second transmitting surface 14; and they are twice imaged at a position $4X_1$ near the first reflecting surface and a position $4X_2$ between the second reflecting surface 13 and the second transmitting surface 14 in the section that is orthogonal to the section including the center axis 1 and contains the center ray $2_0$ of each light beam (the sagittal section: FIG. 14).

The specifications of Example 4 are:

Horizontal angle of view: 360°

Vertical angle of view: 60° (the center angle of view: 10° (the angle of elevation)), Entrance pupil diameter: 0.956 mm, Focal length: 2.014 mm, and Image size: φ2.000 to φ6.000 mm.

The optical system of Example 4 having the image plane 30 located parallel with the ground is preferably used at an angle of view with the center lying substantially in the horizontal direction.

Figure 15:
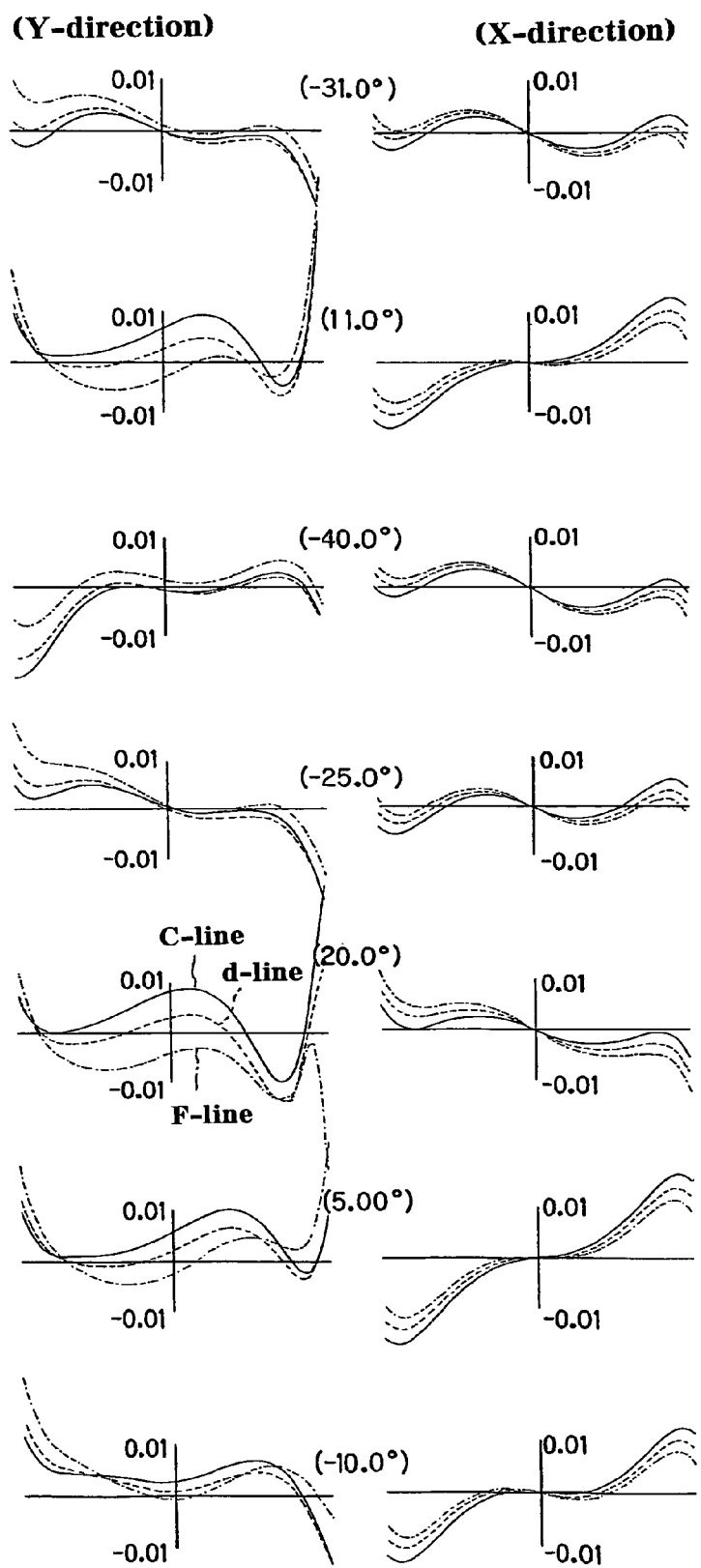
FIG. 15 is a transverse aberration diagram for the whole optical system of Example 4.
Figure 16:
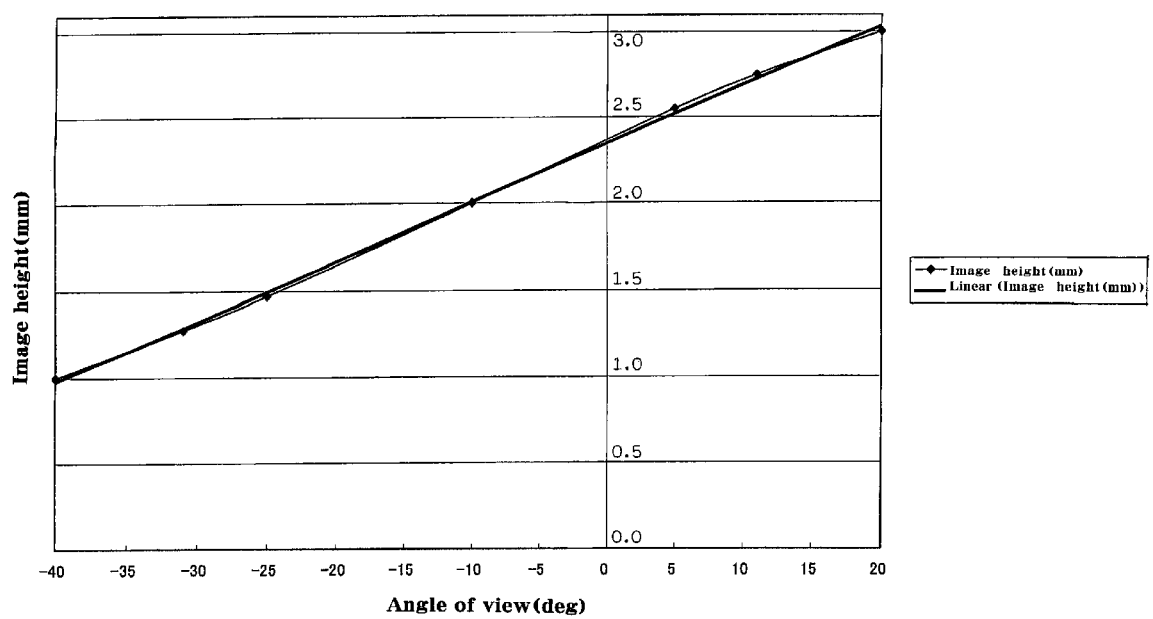
FIG. 16 is indicative of distortion of Example 4 in the vertical direction.

FIG. 15 is illustrative of transverse aberrations for the whole optical system of Example 4, and FIG. 16 is indicative of distortion in the vertical direction of Example 4.

The constructional parameters in Examples 1, 2, 3 and 4 are set out below, wherein the acronyms ASS, ERFS, and RE indicate an aspheric surface, an extended rotation free-form surface, and a reflecting surface, respectively.

| Example 1 | | | | | |
|---|---|---|---|---|---|
| Surface No. | Radius of curvature | Surface separation | Displacement and tilt | Refractive index | Abbe's No. |
| Object plane | ∞ | ∞ | | | |
| 1 | ∞ (Entrance Pupil) | | (1) | | |
| 2 | ERFS [1] | | (2) | 1.5256 | 56.4 |
| 3 | ERFS [2] (RE) | | (3) | 1.5256 | 56.4 |
| 4 | ERFS [3] (RE) | | (4) | 1.5256 | 56.4 |
| 5 | ASS [1] | 0.100 | (5) | | |
| 6 | ∞ (Stop) | 0.714 | | | |
| 7 | 13.574 | 3.000 | | 1.5163 | 64.1 |
| 8 | −9.873 | 0.100 | | | |
| 9 | −201.344 | 1.000 | | 1.7847 | 25.7 |
| 10 | 7.226 | 3.000 | | 1.5174 | 52.4 |
| 11 | −15.105 | 0.100 | | | |
| 12 | 34.308 | 3.000 | | 1.6510 | 56.1 |
| 13 | −26.057 | 0.134 | | | |
| 14 | 15.581 | 3.000 | | 1.5400 | 59.4 |
| 15 | −16.460 | 4.811 | | | |
| Image plane | ∞ | | | | |

| ERFS [1] | |
|---|---|
| RY | −407.764 |
| θ | −24.031 |
| R | −8.926 |

| ERFS [2] | |
|---|---|
| RY | −27.646 |
| θ | −42.490 |
| R | 15.421 |

| ERFS [3] | |
|---|---|
| RY | 9.271 |
| θ | −63.978 |
| R | −4.901 |

| ASS [1] | |
|---|---|
| R | −26.127 |
| k | −4.9435 |
| a | $1.0196 \times 10^{-3}$ |

-continued

Example 1

Displacement and tilt (1)

| X | 0.000 | Y | 0.000 | Z | −8.926 |
|---|---|---|---|---|---|
| α | 0.000 | β | 0.000 | γ | 0.000 |

Displacement and tilt (2)

| X | 0.000 | Y | 0.000 | Z | 0.000 |
|---|---|---|---|---|---|
| α | 0.000 | β | 0.000 | γ | 0.000 |

Displacement and tilt (3)

| X | 0.000 | Y | −18.734 | Z | 0.000 |
|---|---|---|---|---|---|
| α | 0.000 | β | 0.000 | γ | 0.000 |

Displacement and tilt (4)

| X | 0.000 | Y | 3.368 | Z | 0.000 |
|---|---|---|---|---|---|
| α | 0.000 | β | 0.000 | γ | 0.000 |

Displacement and tilt (5)

| X | 0.000 | Y | −25.932 | Z | 0.000 |
|---|---|---|---|---|---|
| α | −90.000 | β | 0.000 | γ | 0.000 |

Example 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Entrance Pupil) | | (1) | | |
| 2 | ERFS [1] | | (2) | 1.5256 | 56.4 |
| 3 | ERFS [2] (RE) | | (3) | 1.5256 | 56.4 |
| 4 | ERFS [3] (RE) | | (4) | 1.5256 | 56.4 |
| 5 | ASS [1] | 0.100 | (5) | | |
| 6 | ∞ (Stop) | 1.049 | | | |
| 7 | 14.090 | 3.000 | | 1.5163 | 64.1 |
| 8 | −9.442 | 0.100 | | | |
| 9 | −68.986 | 1.000 | | 1.7847 | 25.7 |
| 10 | 8.088 | 4.000 | | 1.5174 | 52.4 |
| 11 | −11.388 | 0.100 | | | |
| 12 | 51.149 | 2.500 | | 1.6510 | 56.1 |
| 13 | −36.305 | 0.134 | | | |
| 14 | 11.121 | 3.000 | | 1.5400 | 59.4 |
| 15 | −37.126 | 4.852 | | | |
| Image plane | ∞ | | | | |

ERFS [1]

| RY | −543.189 |
|---|---|
| θ | −23.182 |
| R | −8.647 |

ERFS [2]

| RY | −27.773 |
|---|---|
| θ | −42.638 |
| R | 15.344 |
| $C_1$ | $-5.3440 \times 10^{-2}$ |
| $C_4$ | $1.6710 \times 10^{-5}$ |
| $C_5$ | $5.6009 \times 10^{-8}$ |

ERFS [3]

| RY | 9.542 |
|---|---|
| θ | −63.948 |
| R | −5.392 |
| $C_1$ | $2.6189 \times 10^{-1}$ |
| $C_4$ | $-1.0991 \times 10^{-3}$ |
| $C_5$ | $5.3738 \times 10^{-5}$ |

-continued

Example 2

ASS [1]

| R | −26.179 |
|---|---|
| k | −1.6433 |
| a | $1.0839 \times 10^{-3}$ |

Displacement and tilt (1)

| X | 0.000 | Y | 0.000 | Z | −8.647 |
|---|---|---|---|---|---|
| α | 0.000 | β | 0.000 | γ | 0.000 |

Displacement and tilt (2)

| X | 0.000 | Y | 0.000 | Z | 0.000 |
|---|---|---|---|---|---|
| α | 0.000 | β | 0.000 | γ | 0.000 |

Displacement and tilt (3)

| X | 0.000 | Y | −18.252 | Z | 0.000 |
|---|---|---|---|---|---|
| α | 0.000 | β | 0.000 | γ | 0.000 |

Displacement and tilt (4)

| X | 0.000 | Y | 4.789 | Z | 0.000 |
|---|---|---|---|---|---|
| α | 0.000 | β | 0.000 | γ | 0.000 |

Displacement and tilt (5)

| X | 0.000 | Y | −25.273 | Z | 0.000 |
|---|---|---|---|---|---|
| α | −90.000 | β | 0.000 | γ | 0.000 |

Example 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Entrance Pupil) | | (1) | | |
| 2 | ERFS [1] | | (2) | 2.0033 | 28.3 |
| 3 | ERFS [2] (RE) | | (3) | 2.0033 | 28.3 |
| 4 | ERFS [3] (RE) | | (3) | 2.0033 | 28.3 |
| 5 | ASS [1] | 0.100 | (5) | | |
| 6 | ∞ (Stop) | 4.533 | | | |
| 7 | −226.207 | 4.000 | | 1.5163 | 64.1 |
| 8 | −8.730 | 0.100 | | | |
| 9 | −26.019 | 3.000 | | 1.5163 | 64.1 |
| 10 | −12.448 | 0.100 | | | |
| 11 | 33.220 | 1.000 | | 1.8467 | 23.8 |
| 12 | 9.891 | 6.000 | | 1.5163 | 64.1 |
| 13 | −27.091 | 0.100 | | | |
| 14 | 20.251 | 3.000 | | 1.7135 | 30.5 |
| 15 | 370.781 | 0.100 | | | |
| 16 | 5.976 | 4.000 | | 1.6382 | 57.0 |
| 17 | 3.884 | 5.173 | | | |
| Image plane | ∞ | | | | |

ERFS [1]

| RY | −271.386 |
|---|---|
| θ | −43.501 |
| R | −8.159 |

ERFS [2]

| RY | −28.784 |
|---|---|
| θ | −42.839 |
| R | 16.775 |
| $C_1$ | $9.1431 \times 10^{-1}$ |

-continued

Example 3

|  |  |
|---|---|
| $C_4$ | $6.4256 \times 10^{-6}$ |
| $C_5$ | $9.4352 \times 10^{-6}$ |

ERFS [3]

|  |  |
|---|---|
| RY | 7.261 |
| θ | −64.121 |
| R | −4.354 |
| $C_1$ | $-9.3633 \times 10^{-1}$ |
| $C_4$ | $-1.9991 \times 10^{-3}$ |
| $C_5$ | $3.1523 \times 10^{-4}$ |

ASS [1]

|  |  |
|---|---|
| R | 90.82 |
| k | $7.9966 \times 10^{+2}$ |
| a | $6.6641 \times 10^{-4}$ |

Displacement and tilt (1)

| X | 0.000 | Y | 0.000 | Z | −8.159 |
|---|---|---|---|---|---|
| α | 0.000 | β | 0.000 | γ | 0.000 |

Displacement and tilt (2)

| X | 0.000 | Y | 0.000 | Z | 0.000 |
|---|---|---|---|---|---|
| α | 0.000 | β | 0.000 | γ | 0.000 |

Displacement and tilt (3)

| X | 0.000 | Y | −20.399 | Z | 0.000 |
|---|---|---|---|---|---|
| α | 0.000 | β | 0.000 | γ | 0.000 |

Displacement and tilt (4)

| X | 0.000 | Y | 1.782 | Z | 0.000 |
|---|---|---|---|---|---|
| α | 0.000 | β | 0.000 | γ | 0.000 |

Displacement and tilt (5)

| X | 0.000 | Y | −28.420 | Z | 0.000 |
|---|---|---|---|---|---|
| α | −90.000 | β | 0.000 | γ | 0.000 |

Example 4

| Surface No. | Radius of curvature | Surface separation | Displacement and tilt | Refractive index | Abbe's No. |
|---|---|---|---|---|---|
| Object plane | ∞ | ∞ |  |  |  |
| 1 | ∞ (Entrance Pupil) |  | (1) |  |  |
| 2 | ERFS [1] |  | (2) | 1.5256 | 56.4 |
| 3 | ERFS [2] (RE) |  | (3) | 1.5256 | 56.4 |
| 4 | ERFS [3] (RE) |  | (3) | 1.5256 | 56.4 |
| 5 | ASS [1] | 0.100 | (5) |  |  |
| 6 | ∞ (Stop) | 0.832 |  |  |  |
| 7 | 7.328 | 2.500 |  | 1.5462 | 47.9 |
| 8 | −5.628 | 1.000 |  |  |  |
| 9 | −4.276 | 1.000 |  | 1.7847 | 25.7 |
| 10 | 6.515 | 5.500 |  | 1.5324 | 56.8 |
| 11 | −6.073 | 0.100 |  |  |  |
| 12 | 18.805 | 3.500 |  | 1.6204 | 60.3 |
| 13 | −10.999 | 0.100 |  |  |  |
| 14 | 6.482 | 2.000 |  | 1.7440 | 44.8 |
| 15 | 4.655 | 3.375 |  |  |  |
| Image plane | ∞ |  |  |  |  |

-continued

Example 4

ERFS [1]

|  |  |
|---|---|
| RY | −23.024 |
| θ | −50.000 |
| R | −6.424 |

ERFS [2]

|  |  |
|---|---|
| RY | −13.951 |
| θ | −34.757 |
| R | 8.349 |
| $C_1$ | −1.3028 |
| $C_4$ | $6.3938 \times 10^{-6}$ |
| $C_5$ | $-7.3606 \times 10^{-5}$ |

ERFS [3]

|  |  |
|---|---|
| RY | 5.936 |
| θ | −62.550 |
| R | −2.476 |
| $C_1$ | $-9.9575 \times 10^{-1}$ |
| $C_4$ | $3.6336 \times 10^{-3}$ |
| $C_5$ | $6.4422 \times 10^{-4}$ |

ASS [1]

|  |  |
|---|---|
| R | −4.70 |
| k | −1.0034 |
| a | $3.9035 \times 10^{-4}$ |

Displacement and tilt (1)

| X | 0.000 | Y | 0.000 | Z | −6.424 |
|---|---|---|---|---|---|
| α | 0.000 | β | 0.000 | γ | 0.000 |

Displacement and tilt (2)

| X | 0.000 | Y | 0.000 | Z | 0.000 |
|---|---|---|---|---|---|
| α | 0.000 | β | 0.000 | γ | 0.000 |

Displacement and tilt (3)

| X | 0.000 | Y | −6.926 | Z | 0.000 |
|---|---|---|---|---|---|
| α | 0.000 | β | 0.000 | γ | 0.000 |

Displacement and tilt (4)

| X | 0.000 | Y | 3.673 | Z | 0.000 |
|---|---|---|---|---|---|
| α | 0.000 | β | 0.000 | γ | 0.000 |

Displacement and tilt (5)

| X | 0.000 | Y | −11.301 | Z | 0.000 |
|---|---|---|---|---|---|
| α | −90.000 | β | 0.000 | γ | 0.000 |

In Examples 1 to 4, by the way, the entrance pupil 6Y in the plane including the center axis 1 is formed near the entrance surface 11 by locating the aperture 5 between the front unit 10 and the rear unit 20 coaxially with the center axis 1, and back projecting that aperture 5 onto the object side in the plane including the center axis 1. Instead of using that aperture 5, however, a cylindrical or zonal slit may be located at the position of the entrance pupil 6Y coaxially with the center axis 1. In that case, the slit itself acts as a stop to form the entrance pupil 6Y. It is more preferable that apart from the aperture 5 located between the front unit 10 and the rear unit 20, there is a flare stop located near the entrance surface 11, which stop is formed of a cylindrical or zonal slit that is rotationally symmetric about the center axis 1. Note here that such a flare stop may also serve as the slit to form the entrance pupil 6Y.

Further, in the above-exemplified optical systems, it is possible to make the angle of view wider in the sectional direction including the axis 1 of rotational symmetry, if a Y-toric lens is added on the front unit 10 further on the object side. It is here noted that the Y-toric lens should be configured of a surface rotationally symmetric with respect to the Y-axis (the center axis 1) while it has no power in the X-direction but yet has negative power in the Y-direction (the section of FIG. 1 or the like). More preferably, that toric lens should be configured into a negative meniscus lens shape that is convex on the object side in the Y-Z section, thereby minimizing image distortion and making better correction of aberrations.

Furthermore, if the front unit 10 is provided on its object side with not only one Y-toric lens of negative meniscus shape in section but also two or three lenses of meniscus shape, it is then possible to reduce image distortion as much as possible. If an additional reflecting surface or prism rotationally symmetric with respect to the center axis 1 instead of a lens is provided, it is then easy to observe or pick up images in any direction by reflection and refraction of light rays.

In the foregoing examples, each reflecting surface, and each refracting surface in the front unit 10 is constructed of an extended rotation free-form surface that is formed by rotation of a line segment of any shape about the axis 1 of rotational and has no vertex on the axis 1 of rotational symmetry; however, it is easy to replace them by any desired curved surfaces. It is also easy to replace them by any rotationally symmetric aspheric surface with the vertex lying on the axis 1 of symmetry.

The optical system of the invention also makes correction of an image plane tilt occurring by decentration and pupil aberrations of the stop upon back projection by making use of the formula that defines a line segment of any shape with an odd-number order term incorporated in it.

By immediate use of the transparent medium that forms the front unit 10 according to the invention and is rotationally symmetric about the center axis 1, images having a full 360°-direction angle of view may be taken or projected. However, it is acceptable to cut that transparent medium along a section including the center axis 1 into ½, ⅓, ⅔, etc. for the purpose of taking or projecting an image having an angle of view of 180°, 120°, 240°, etc.

While the optical system of the invention has been described with reference to an imaging or viewing optical system for obtaining an image having a full 360°-direction angle of view (a full-panoramic image) including the zenith with the center axis 1 (axis of rotational symmetry) lying in the vertical direction, it is understood that the invention is not only for taking optical systems, but equally applicable to a projection optical system in which the optical path is the other way around to project an image at a full 360° (panoramic)-direction angle of view. An endoscope could be used as a full-panoramic viewing optical system for in-tract viewing apparatus.

Figure 18A:
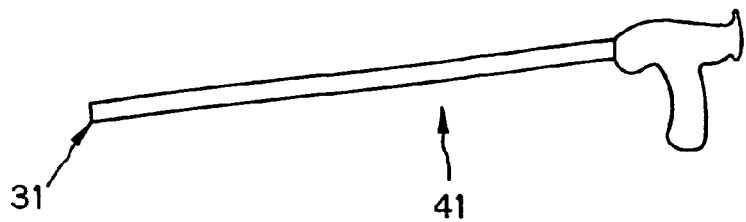
FIG. 18 is illustrative of an example of using the panoramic taking optical system of the invention as a taking optical system at the endmost portion of an endoscope.
Figure 18B:
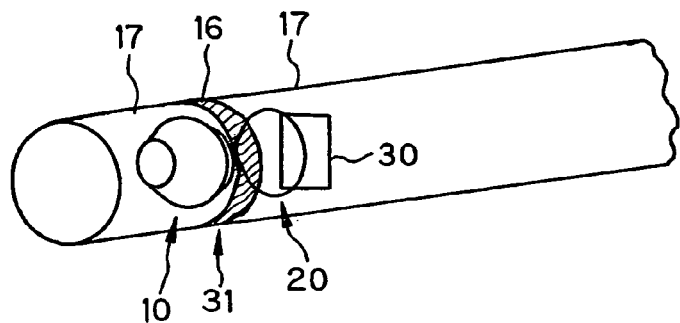
Figure 18C:
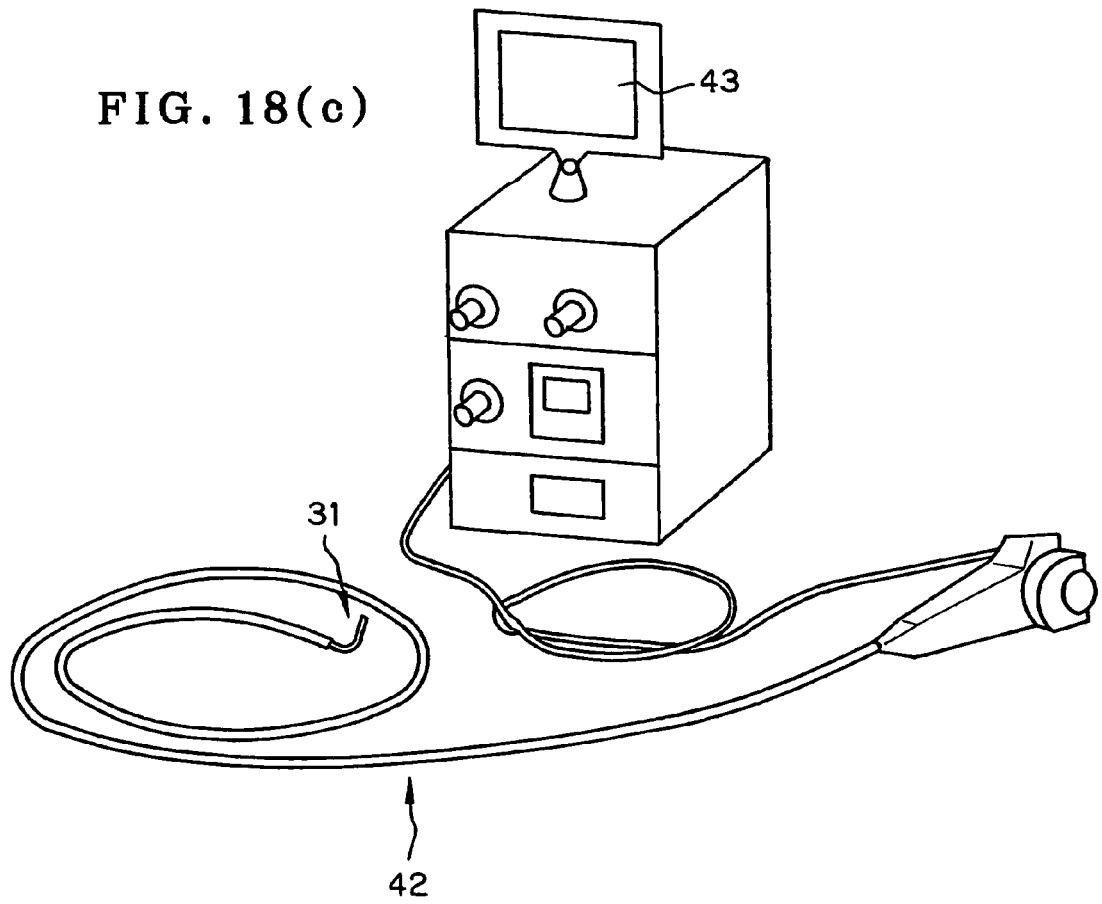

How to use a panoramic taking optical system 31 or panoramic projection optical system 32 is now explained as a typical example of application of the optical system of the invention. FIG. 18 is generally illustrative of an example of the panoramic taking optical system 31 of the invention used as taking optical system attached to the endmost portion as a taking optical system of an endoscope. More specifically, FIG. 18(*a*) is illustrative of the panoramic taking optical system 31 of the invention that is attached to the endmost portion of a hard endoscope 41 to take and view a full 360°-direction image, and FIG. 18(*b*) is illustrative in schematic of the endmost construction of that. In the panoramic taking optical system 31 of the invention, a flare stop 17 defined by a casing having a circumferentially extending slit-form aperture 16 or the like is located around the entrance surface 11 of the front unit 10 to prevent entrance of flare light. FIG. 18(*c*) is illustrative of the panoramic taking optical system 31 of the invention attached to the endmost portion of a soft electronic endoscope 42, wherein picked up images are displayed on a display 43 after imaging processing for distortion correction.

Figure 19A:
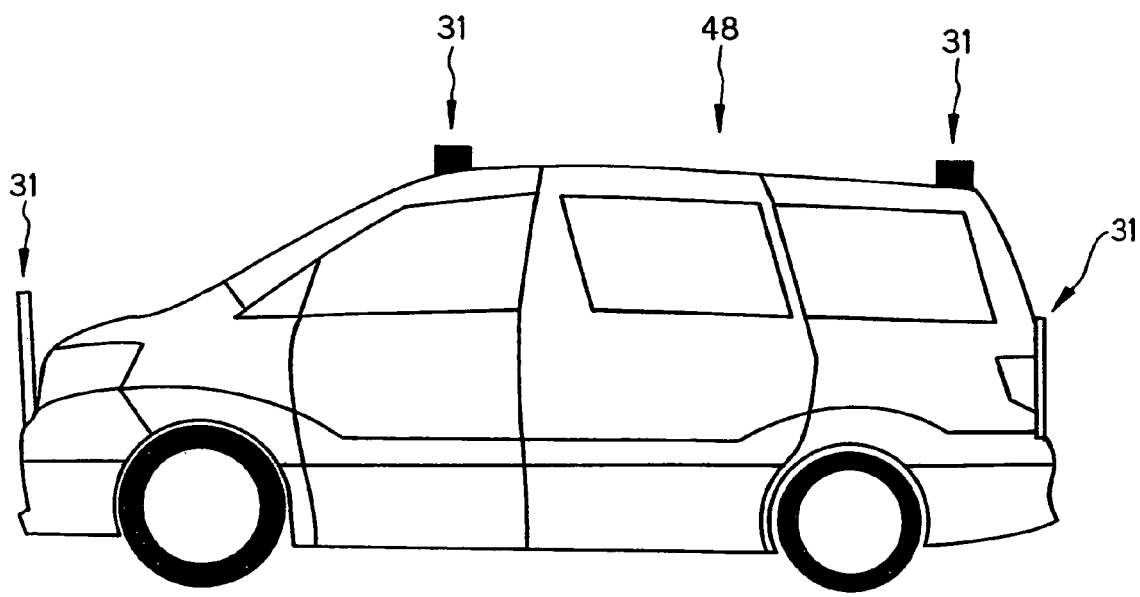
FIG. 19 is illustrative of one example of using the panoramic taking optical system of the invention as taking optical systems at the corners and head s pole tops of a car.
Figure 19B:
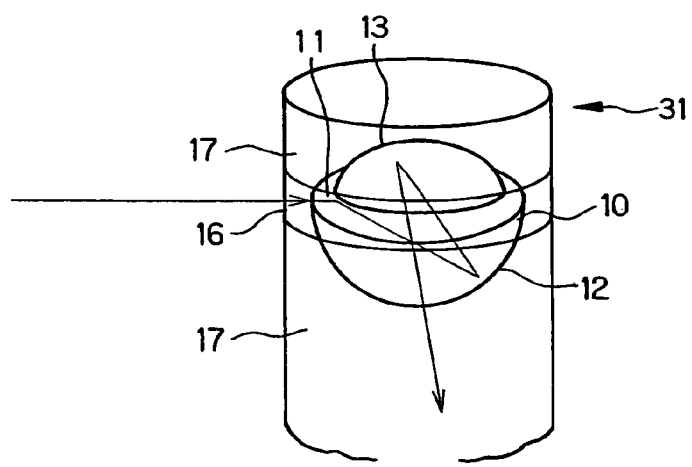

FIG. 19(*a*) is illustrative of a plurality of panoramic taking optical systems 31 of the invention that are attached to the corners and head s pole top of a car 48 as taking optical systems to display images taken via the panoramic taking optical systems 31 simultaneously on an interior display after image processing for correction of distortion, and FIG. 19(*b*) is illustrative in schematic of the endmost construction of that. In the panoramic taking optical system 31 of the invention, a flare stop 17 defined by a casing having a circumferentially extending slit-form aperture 16 or the like is located around the entrance surface 11 of the front unit 10 to prevent entrance of flare light.

Figure 20:
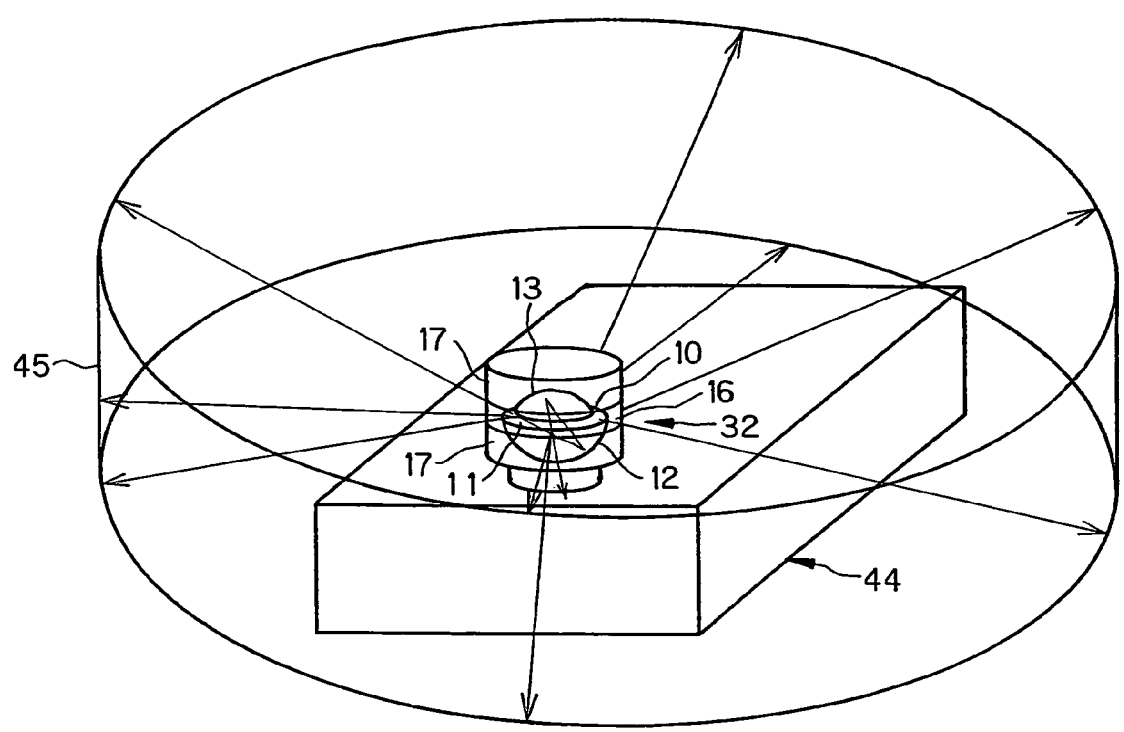
FIG. 20 is illustrative of one example of using the panoramic projection optical system of the invention as a projection optical system in a projector.

FIG. 20 is illustrative of an example of a projector 44 in which the panoramic projection optical system 32 of the invention is used as its projection optical system. A panoramic image is displayed on a display device located on the image plane of the system 32, so that a full 360°-direction image is projected and displayed on a full 360°-direction screen 45 through the panoramic optical system 32.

Figure 21:
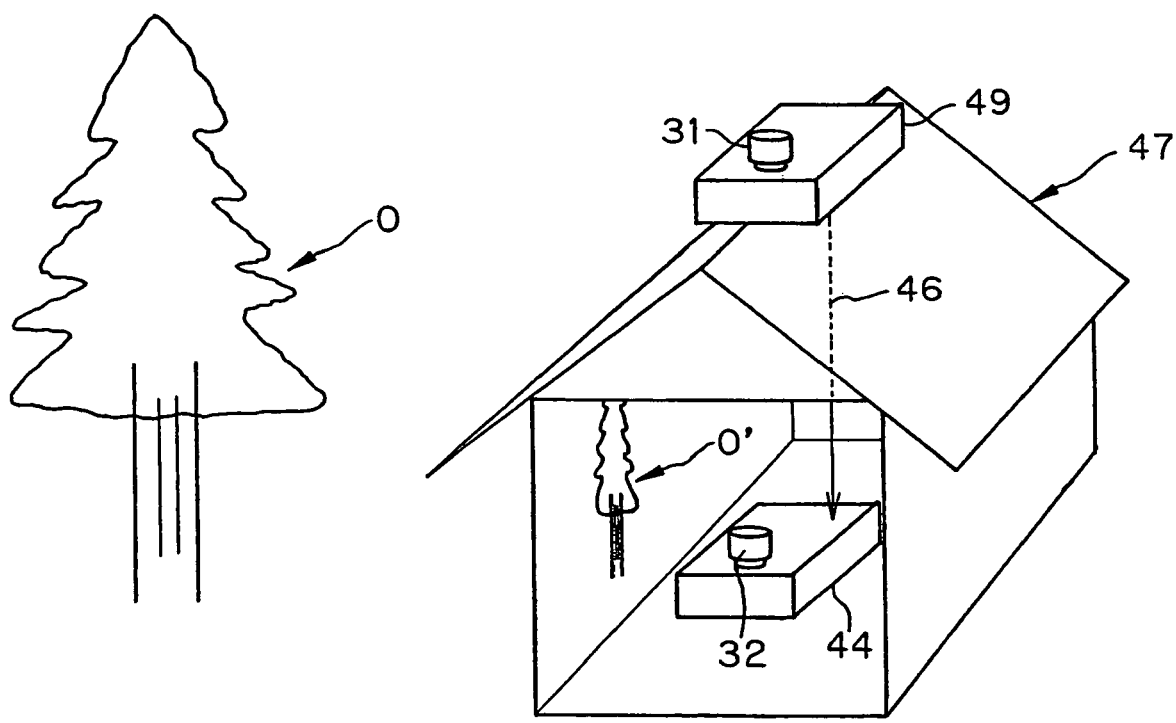
FIG. 21 is illustrative of an example of taking an image of a subject outside a house using the panoramic taking optical system of the invention to project and display it within the house through the panoramic projection optical system of the invention.

FIG. 21 is illustrative of a taking device 49 using the panoramic taking optical system 31 of the invention, which is attached to the outside of a house 47, and a projector 44 using the panoramic projection optical system 32 of the invention, which is located inside. An image picked up by the taking device 49 is sent to the projector 44 via an electric wire 46. Such being the arrangement, a full 360°-direction subject O outside the house is taken by the taking device 49 via the panoramic taking optical system 31, and the ensuing image signals are sent to the projector 44 via the electric wire 46. An image of the subject is displayed on a display device located on an image plane, so that the image O of the subject O is projected and displayed on the inside wall surface or the like of the house via the panoramic projection optical system 32.

APPLICABILITY TO THE INDUSTRY

The invention as described above makes it possible to obtain an optical system that is adapted to obtain an image having a full 360°-direction angle of view or project an image at a full 360°-direction (full-panoramic) angle of view, and that is of small-format size and well corrected for aberrations without being affected by flare light yet with high resolving power.

I claim:

1. An optical system adapted to form an image having a full 360°-direction (full-panoramic) angle of view on an image plane or project an image located on an image plane at a full 360°-direction angle of view, comprising:

a front unit having two reflecting surfaces, each rotationally symmetric about a center axis, a rear unit that is rotationally symmetric about the center axis and has positive power, and an aperture located coaxially with the center axis, wherein:

said front unit comprises a transparent medium that is rotationally symmetric about the center axis and comprises a first transmitting surface, a first reflecting surface, a second reflecting surface and a second transmitting surface;

said first reflecting surface is located on an image plane side with respect to said first transmitting surface, said second reflecting surface is located in opposition to an image plane with respect to said first reflecting surface, and said second transmitting surface is located more on the image plane side than said first transmitting surface; and in order of travel of light rays in the case of an imaging system or in reverse order of travel of light rays in the case of a projection system, a light beam incident onto said front unit enters the transparent medium via said first transmitting surface, is reflected at said first reflecting surface located in opposition to said first transmitting surface with the center axis between them in a direction away from the image plane and then reflected at said second reflecting surface located on the same side with respect to the center axis in a direction toward the image plane side, and leaves said transparent medium via said second transmitting surface, forming an image at a position of the image plane off the center axis by way of said rear unit, wherein in a section including the center axis and in a section orthogonal to said section and including a center ray of said light beam, a position of an entrance pupil differs such that said entrance pupil in the section including said center axis is positioned near said second reflecting surface.

2. The optical system according to claim 1, characterized by satisfying the following condition (1):

$$1° < \eta < 10° \quad (1)$$

where $\eta$ is an angle of a center chief ray with a normal to said first reflecting surface upon reflection at said first reflecting surface, provided that said center chief ray is defined by a light ray passing through a center of said aperture at a center of an angle of view in a meridional section.

3. The optical system according to claim 2, characterized by satisfying the following conditions (2) and (3):

$$0.7 < |C1x/C2x| < 5.0 \quad (2)$$

$$0.35 < |C1x/C3x| < 2.0 \quad (3)$$

where C1y, C2y and C3y are curvatures of a meridional section at positions of a center chief ray incident onto said first transmitting surface, said first reflecting surface and said second reflecting surface, respectively, and C1x, C2x and C3x are curvatures of a section orthogonal to the center axis, provided that said center chief ray is defined by a light ray passing through a center of said aperture at a center of an angle of view in the meridional section.

4. The optical system according to claim 2, characterized in that the entrance pupil in the section including the center axis is positioned near said first transmitting surface, and the entrance pupil in the section orthogonal to the section including the center axis is positioned near the center axis.

5. The optical system according to claim 2, characterized in that the number of formation of a stop image obtained by projection of said aperture in a direction opposite to a direction of incidence of said light beam is the same in the section including the center axis and in the section orthogonal to said section and including the center ray of said light beam.

6. The optical system according to claim 2, characterized in that at least one reflecting surface has a rotationally symmetric shape formed by rotation about the center axis of a line segment of any arbitrary shape having no plane of symmetry.

7. The optical system according to claim 2 characterized in that at least one reflecting surface has a rotationally symmetric shape formed by rotation about the center axis of a line segment of any arbitrary shape including an odd-numbered order term.

8. The optical system according to claim 2, characterized in that a flare stop for limiting the aperture only in the section including the enter axis is located near the entrance pupil conjugate with a stop formed by said front unit on an object side in the section including the center axis.

9. The optical system according to claim 1, characterized by satisfying the following conditions (2) and (3):

$$0.7 < |C1x/C2x| < 5.0 \quad (2)$$

$$0.35 < |C1x/C3x| < 2.0 \quad (3)$$

where C1y, C2y and C3y are curvatures of a meridional section at positions of a center chief ray incident onto said first transmitting surface, said first reflecting surface and said second reflecting surface, respectively, and C1x, C2x and C3x are curvatures of a section orthogonal to the center axis, provided that said center chief ray is defined by a light ray passing through a center of said aperture at a center of an angle of view in the meridional section.

10. The optical system according to claim 9, characterized in that the entrance pupil in the section including the center axis is positioned near said first transmitting surface, and the entrance pupil in the section orthogonal to the section including the center axis is positioned near the center axis.

11. The optical system according to claim 9, characterized in that the number of formation of a stop image obtained by projection of said aperture in a direction opposite to a direction of incidence of said light beam is the same in the section including the center axis and in the section orthogonal to said section and including the center ray of said light beam.

12. The optical system according to claim 9, characterized in that at least one reflecting surface has a rotationally symmetric shape formed by rotation about the center axis of a line segment of any arbitrary shape having no plane of symmetry.

13. The optical system according to claim 9 characterized in that at least one reflecting surface has a rotationally symmetric shape formed by rotation about the center axis of a line segment of any arbitrary shape including an odd-numbered order term.

14. The optical system according to claim 9, characterized in that a flare stop for limiting the aperture only in the section including the enter axis is located near the entrance pupil conjugate with a stop formed by said front unit on an object side in the section including the center axis.

15. The optical system according to claim 1, characterized in that the entrance pupil in the section including the center axis is positioned near said first transmitting surface, and the entrance pupil in the section orthogonal to the section including the center axis is positioned near the center axis.

16. The optical system according to claim 15, characterized in that the number of formation of a stop image obtained by projection of said aperture in a direction opposite to a direction of incidence of said light beam is the same in the section including the center axis and in the section orthogonal to said section and including the center ray of said light beam.

17. The optical system according to claim 1, characterized in that the number of formation of a stop image obtained by projection of said aperture in a direction opposite to a direction of incidence of said light beam is the same in the section including the center axis and in the section orthogonal to said section and including the center ray of said light beam.

18. The optical system according to claim 1, characterized in that at least one reflecting surface has a rotationally symmetric shape formed by rotation about the center axis of a line segment of any arbitrary shape having no plane of symmetry.

19. The optical system according to claim 1, characterized in that at least one reflecting surface has a rotationally symmetric shape formed by rotation about the center axis of a line segment of any arbitrary shape including an odd-numbered order term.

20. The optical system according to claim 1, characterized in that a flare stop for limiting the aperture only in the section including the enter axis is located near the entrance pupil conjugate with a stop formed by said front unit on an object side in the section including the center axis.

21. The optical system according to claim 1, characterized in that said rear unit comprises a rotationally symmetric, coaxial dioptric optical system.

22. The optical system according to claim 1, characterized in that instead of or in addition to said aperture, a zonal slit aperture rotationally symmetric about the center axis is located near said first transmitting surface of the front unit.

23. The optical system according to claim 1, characterized in that at least said reflecting surfaces are cut in the section including the center axis such that the angle of view about the center axis is narrower than 360°.

\* \* \* \* \*